United States Patent
Chen et al.

(10) Patent No.: US 7,673,260 B2
(45) Date of Patent: Mar. 2, 2010

(54) MODELING DEVICE VARIATIONS IN INTEGRATED CIRCUIT DESIGN

(75) Inventors: Haizhou Chen, Santa Clara, CA (US); Li-Fu Chang, Santa Clara, CA (US); Richard Rouse, Santa Clara, CA (US); Nishath Verghese, Santa Clara, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 282 days.

(21) Appl. No.: 11/586,827

(22) Filed: Oct. 24, 2006

(65) Prior Publication Data

US 2007/0099314 A1 May 3, 2007

Related U.S. Application Data

(60) Provisional application No. 60/729,555, filed on Oct. 24, 2005.

(51) Int. Cl.
*G06F 17/50* (2006.01)
(52) U.S. Cl. .......................................................... 716/4
(58) Field of Classification Search ................ 716/1–18
See application file for complete search history.

(56) References Cited

U.S. PATENT DOCUMENTS

| | | | |
|---|---|---|---|
| 4,827,428 A | 5/1989 | Dunlop et al. |
| 4,904,569 A | 2/1990 | Fukuda et al. |
| 5,293,216 A | 3/1994 | Moslehi et al. |
| 5,764,532 A | 6/1998 | Patel |
| 5,974,244 A | 10/1999 | Hayashi et al. |
| 6,014,505 A | 1/2000 | Schorn |
| 6,169,968 B1 | 1/2001 | Kabuo |

(Continued)

FOREIGN PATENT DOCUMENTS

JP          05198678        8/1993

(Continued)

OTHER PUBLICATIONS

Acar, E. et al., "A Linear-Centric Simulation Framework for Parametric Fluctions", 2002 Proceedings of Design, Automation and Test in Europe Conference and Exhibition, Mar. 4, 2002, pp. 1-8.

(Continued)

*Primary Examiner*—Jack Chiang
*Assistant Examiner*—Aric Lin
(74) *Attorney, Agent, or Firm*—Sheppard Mullin Richter & Hampton LLP

(57) ABSTRACT

DFM systems are provided that incorporate manufacturing variations in the analysis of integrated circuits by calculating predicted manufacturing variations on the shapes of interconnects and devices of the drawn layout of a circuit design. The shape variation on interconnects is converted to variations in resistor-capacitor (RC) parasitics. The shape variation on devices is converted to variations in device parameters. The variation in device parameters and wire parasitics is converted to changes in timing performance, signal integrity, and power consumption by determining the impact of device parameter and wire parasitic variations on the behavior of each instance of a standard cell. The results from these analyses are integrated back into the design flow as incremental delay files (timing), noise failures and buffer insertion/driver resizing commands (noise), and leakage power hotspots and cell substitution commands (power consumption).

46 Claims, 15 Drawing Sheets

U.S. PATENT DOCUMENTS

| | | | |
|---|---|---|---|
| 6,209,121 | B1 | 3/2001 | Goto |
| 6,209,122 | B1 | 3/2001 | Jyu et al. |
| 6,219,631 | B1 | 4/2001 | Oh et al. |
| 6,306,769 | B1 | 10/2001 | Subramanian et al. |
| 6,378,109 | B1 | 4/2002 | Young et al. |
| 6,425,110 | B1 | 7/2002 | Hathaway et al. |
| 6,507,936 | B2 | 1/2003 | Yamaguchi |
| 6,553,338 | B1 | 4/2003 | Buch et al. |
| 6,618,837 | B1 | 9/2003 | Zhang et al. |
| 6,990,651 | B2 | 1/2006 | Balasubramanian et al. |
| 7,305,334 | B2 * | 12/2007 | Graur et al. .................. 703/14 |
| 2002/0196629 | A1 | 12/2002 | Terashi |
| 2003/0167451 | A1 | 9/2003 | Igarashi |
| 2003/0229412 | A1 | 12/2003 | White et al. |
| 2004/0010764 | A1 | 1/2004 | Zhang et al. |
| 2004/0052411 | A1 | 3/2004 | Qian et al. |
| 2004/0170905 | A1 | 9/2004 | Liebmann et al. |
| 2004/0172609 | A1 | 9/2004 | Hassibi et al. |
| 2004/0210863 | A1 | 10/2004 | Culp et al. |
| 2004/0243964 | A1 | 12/2004 | McElvain et al. |
| 2005/0027501 | A1 | 2/2005 | Chen et al. |
| 2005/0034087 | A1 | 2/2005 | Hamlin et al. |
| 2005/0108666 | A1 * | 5/2005 | Chang et al. .................. 716/2 |
| 2005/0172251 | A1 | 8/2005 | Chang et al. |
| 2005/0251771 | A1 * | 11/2005 | Robles .......................... 716/5 |
| 2006/0015834 | A1 | 1/2006 | Amekawa |

FOREIGN PATENT DOCUMENTS

| | | |
|---|---|---|
| JP | 06149925 | 5/1994 |
| JP | 07056976 | 3/1995 |
| JP | 09006831 | 1/1997 |
| JP | 2003076737 | 3/2003 |

OTHER PUBLICATIONS

Anne, P. et al., "Comparative Analysis of New CMOS Leaf Cells for OTC Routing", IEEE International Symposium on Circuits and Systems, May 30, 1994, vol. 4, pp. 191-194.

Dai, W. et al., "Timing Analysis Taking Into Account Interconnect Process Variation", IEEE International Workshop on Statistical Methodology, Jun. 10, 2001, pp. 51-53.

Xue, T. et al., "Sensitivity-Based Wiresizing Approach to Interconnect Optimization of Lossy Transmission Line Topologies", 1996 IEEE Multi-Chip Module Conference, Feb. 6, 1996, pp. 117-122.

* cited by examiner

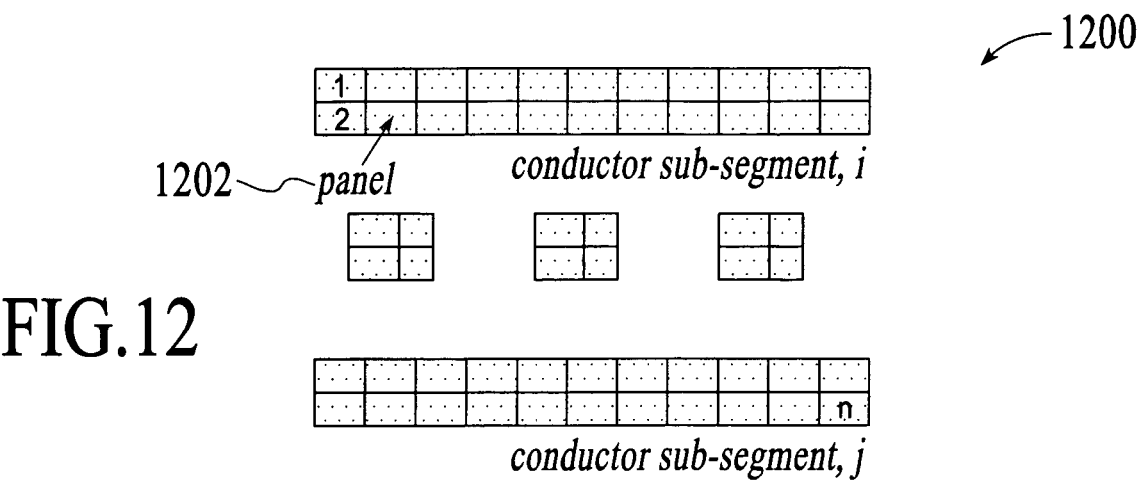
FIG.12
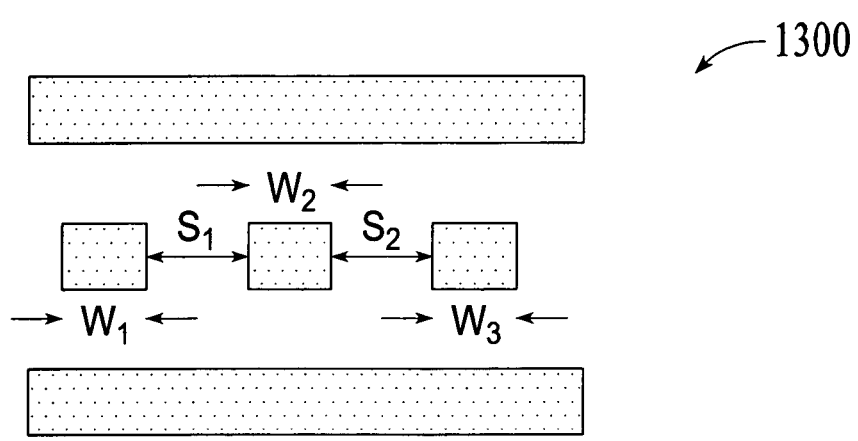
FIG.13
FIG.14
| $W_1$ | $W_2$ | $W_3$ | $S_1$ | $S_2$ | $C_c$ | $C_g$ |
|---|---|---|---|---|---|---|
| 1 | 2 | 2 | 1 | 2 | $f_1(..)$ | $f_2(..)$ |
| ... | ... | ... | ... | ... | ... | ... |
| | | | | | | |
| | | | | | | |
| | | | | | | |
| | | | | | | |
| | | | | | | |

US 7,673,260 B2

MODELING DEVICE VARIATIONS IN INTEGRATED CIRCUIT DESIGN

RELATED APPLICATIONS

This application claims the benefit of U.S. patent application Ser. No. 60/729,555, filed Oct. 24, 2005. This application is related to U.S. patent application Ser. No. 10/984,210, now U.S. Pat. No. 7,360,191, and U.S. patent application Ser. No. 10/984,443, now U.S. Pat. No. 7,216,320, both of which were filed on Nov. 8, 2004, and claim the benefit of U.S. patent application Nos. 60/517,648 and 60/517,664, both filed on Nov. 6, 2003, and U.S. patent application Ser. No. 60/559,267, filed on Apr. 2, 2004.

TECHNICAL FIELD

The disclosure herein relates generally to fabricating integrated circuits. In particular, this disclosure relates to systems and methods for manufacturing integrated circuit devices or chips.

BACKGROUND

Manufacturing of integrated circuit (IC) devices introduces distortions in the circuits of the devices. FIG. 1 shows a comparison between drawn design data 102 and resulting manufacturing variations 104 on a manufactured chip under the prior art. This comparison shows the impact of manufacturing variations on a design by showing the drawn design data 102 and the corresponding image 104 obtained on Silicon after manufacturing. It is evident from a comparison of this drawn design data 102 and the resulting images 104 on Silicon that shapes are distorted during the manufacturing process. These shape distortions can cause the circuit corresponding to the design to behave differently than expected when embodied on Silicon. If these manufacturing variations can be captured during the design analysis phase, there is increased predictability of design behavior and consequently an increased chance of design success. Consequently, there is a need for an integrated design-manufacturing process that predicts manufacturing variations during the IC design process.

INCORPORATION BY REFERENCE

Each publication, patent, and/or patent application mentioned in this specification is herein incorporated by reference in its entirety to the same extent as if each individual publication, patent, and/or patent application was specifically and individually indicated to be incorporated by reference.

BRIEF DESCRIPTION OF THE DRAWINGS

FIG. 12 shows interconnect sub-segments partitioned into panels, under an embodiment.

FIG. 13 shows parameterized neighboring wire configurations for use in pre-characterizing capacitance, under an embodiment.

FIG. 14 is a table (parameterized) of capacitance equations for characterizing capacitance of interconnects relative to neighboring wires and to ground, under an embodiment.

DETAILED DESCRIPTION

Systems and methods to predict and incorporate manufacturing variations in the analysis of integrated circuits (ICs) are described below, and are collectively referred to herein as design-for-manufacturing (DFM) systems. The DFM systems described below predict manufacturing variations and integrate information of the predicted variations into conventional design flows for integrated circuits. As an example, information of the predicted variations can be integrated at the "sign-off" stage where the design is analyzed for timing performance, signal integrity, and power consumption. The DFM systems described herein incorporate manufacturing variations into a design flow by first computing the manufacturing variations, then calculating these variations on wire parasitics and device behavior. Finally, the impact of the modified wire parasitics and device behavior on the timing performance, signal integrity and power consumption of the design is determined.

The DFM systems described herein incorporate manufacturing variations in the analysis of integrated circuits by calculating the expected or predicted manufacturing variations on the shapes of wires and devices of the drawn layout of a circuit design. The shape variation on wires is converted to variations in resistor-capacitor (RC) parasitics, while the shape variation on devices (e.g. transistors) is converted to variations in device parameters. The variation in device parameters and wire parasitics are converted to changes in timing performance (e.g. delay), signal integrity (e.g. noise failures), and power consumption (e.g. leakage power) by determining the impact of device parameter and wire parasitic variations on the behavior of each instance of a standard cell of the circuit design. The results from these analyses are integrated back into the design flow. The timing performance changes are integrated into the design flow as incremental delay files for example. The changes in signal integrity are integrated into the design flow as noise failures and buffer insertion/driver resizing commands (Engineering Change Order (ECO) commands). The power consumption changes are integrated into the design flow as leakage power hotspots and cell substitution ECO commands. The ECO commands direct the place and route tools to fix the noise and power hotspot problems uncovered during analysis.

In the following description, numerous specific details are introduced to provide a thorough understanding of, and enabling description for, embodiments of the DFM systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments of the DFM systems.

Figure 1:
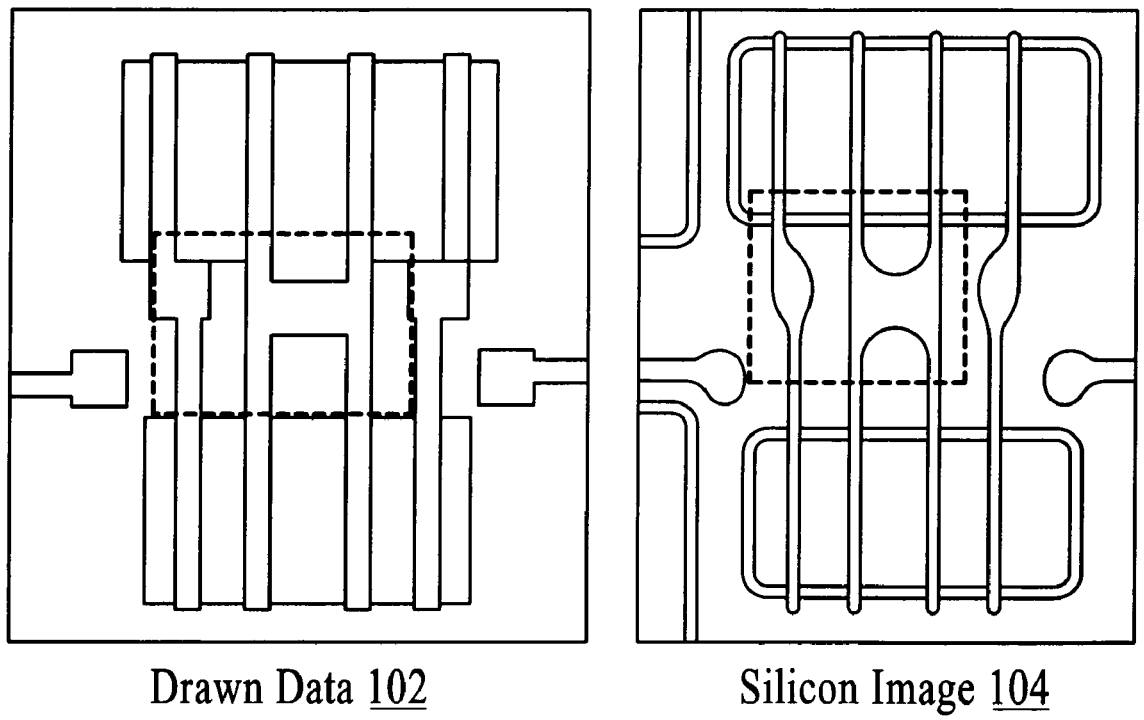
FIG. 1 shows a comparison between drawn design data and resulting manufacturing variations on a manufactured chip under the prior art.
Figure 2:
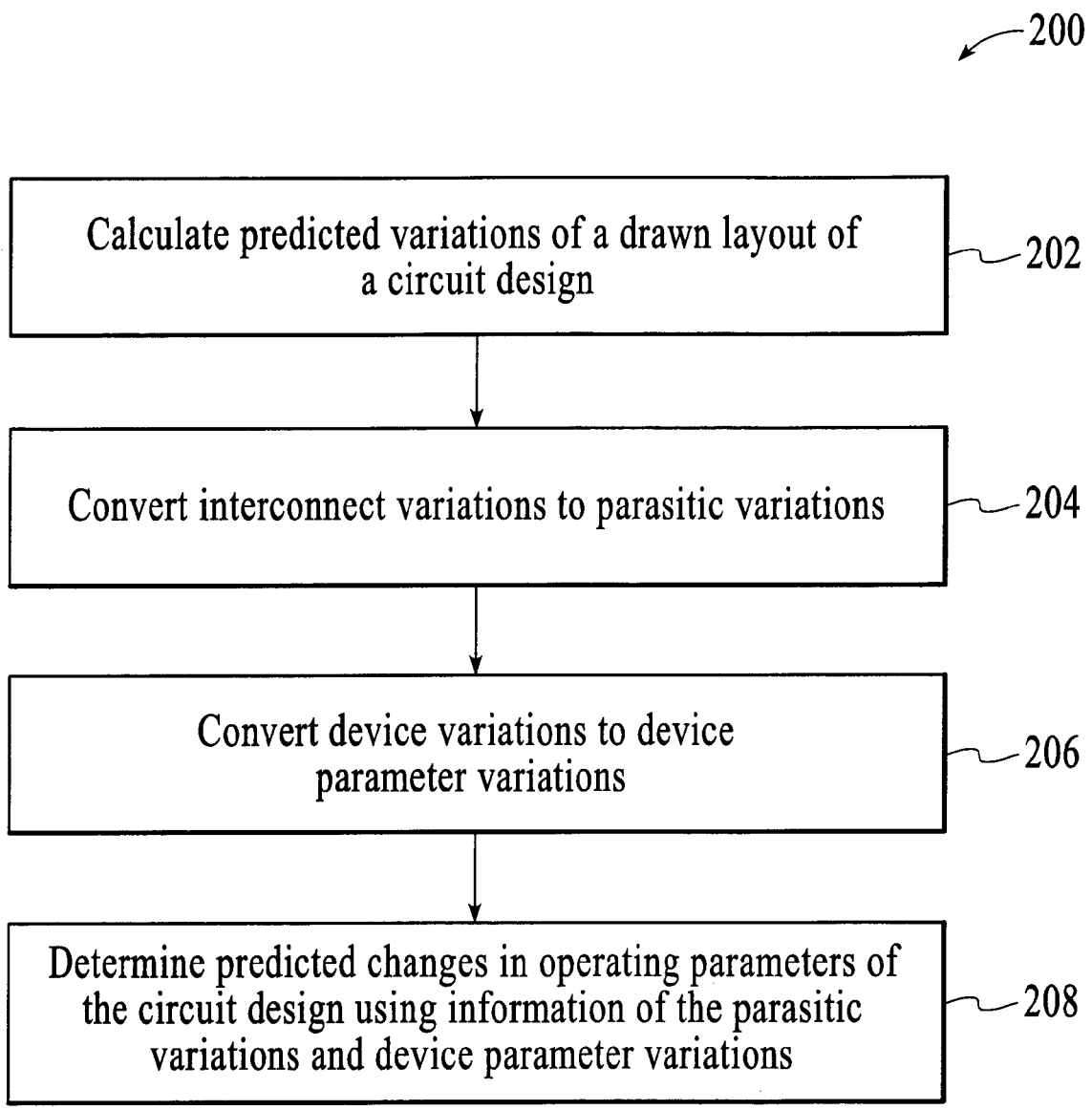
FIG. 2 is a flow diagram for integrating or incorporating manufacturing variations in the analysis of ICs, under an embodiment.

FIG. 2 is a flow diagram for integrating or incorporating 200 manufacturing variations in the analysis of ICs, under an embodiment. Operation begins by calculating 202 predicted variations of a drawn layout of a circuit design. The predicted variations include shape variations of interconnects and devices of the circuit design predicted to result during manufacturing of circuits under the circuit design. The interconnect variations are converted 204 to parasitic variations. The device variations are converted 206 to device parameter variations. Predicted changes in operating parameters of the circuit design are determined 208 using information of the parasitic variations and device parameter variations. As described in detail below, information of the predicted changes in operating parameters of the circuit design can be used to modify the circuit design but the embodiment is not so limited. The integration of manufacturing variations in the analysis of ICs is described in more detail below.

Figure 3:
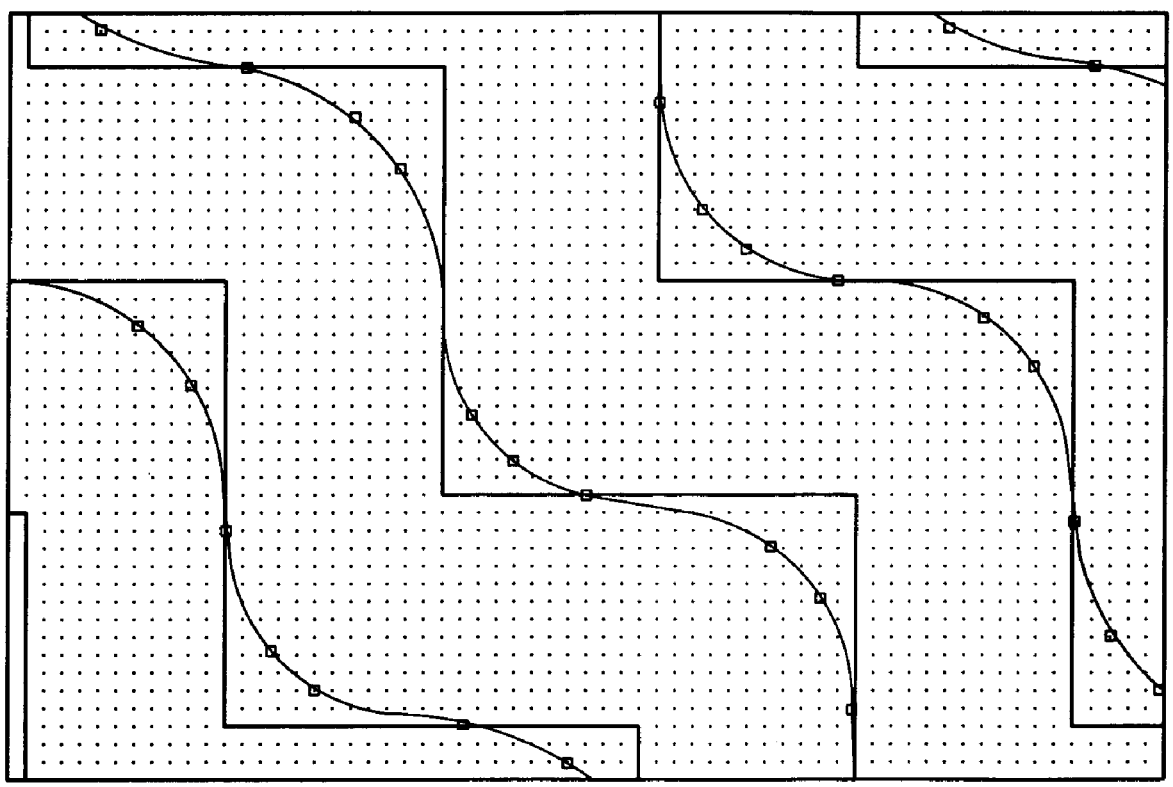
FIG. 3 shows actual drawn shapes and the corresponding predicted shapes predicted to result from manufacturing, under an embodiment.

Using a behavioral model that encapsulates the manufacturing process in the foundry, it is possible to predict shape distortions introduced during fabrication of any drawn layer, as described in the Related Applications. Such a prediction can be made during the design phase when the design layout is drawn. FIG. 3 shows actual drawn shapes (straight lines) and the corresponding predicted shapes predicted to result from manufacturing (curved lines), under an embodiment.

The predicted shapes of the manufactured circuit, also referred to as distorted shapes, impact the behavior of both interconnect wires and devices, both of which need to be analyzed.

Figure 4:
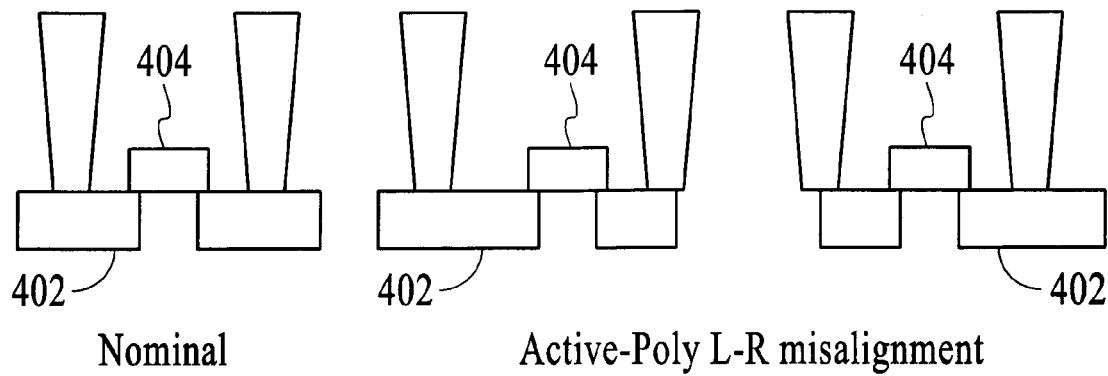
FIG. 4 shows process misalignment between active diffusion and polysilicon layers resulting during manufacturing.
Figure 5:
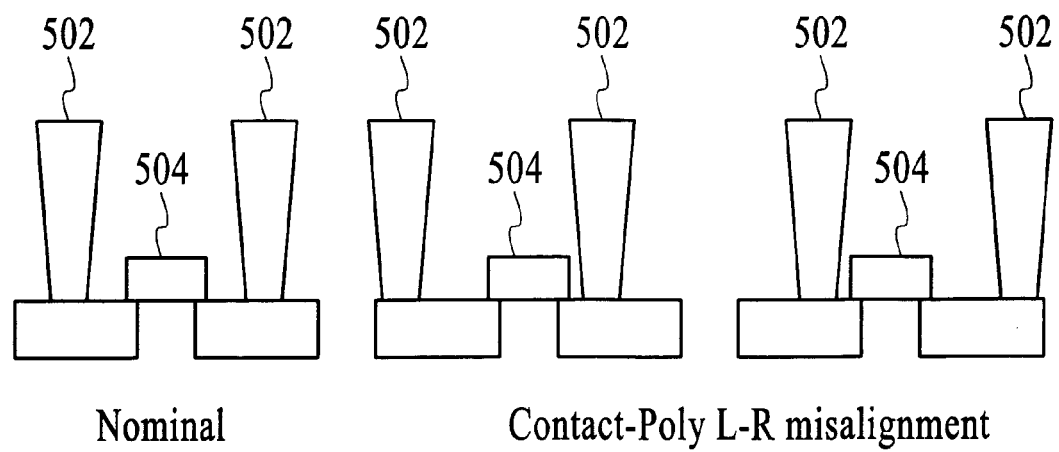
FIG. 5 shows process misalignment between contact and polysilicon layers resulting during manufacturing.

In addition to shape distortion, a misalignment of process layers can also result during manufacturing. FIG. 4 shows process misalignment between active diffusion 402 and polysilicon 404 layers resulting during manufacturing. The process misalignment between active diffusion 402 and polysilicon 404 layers causes alterations in transistor parameters, as described by Clive Bittlestone et. al., "Nanometer Design Effects and Modeling," International Solid Circuits Conference Workshop on DFM, 2005 (Bittlestone). FIG. 5 shows process misalignment between contact 502 and polysilicon 504 layers resulting during manufacturing. The process misalignment between contact 502 and polysilicon 504 layers causes changes in gate-contact capacitance, also described by Bittlestone, because the distance between the contact layer 502 and the polysilicon layer 504 can change with misalignment resulting in a change in the parasitic capacitance between these two layers. Such a misalignment between the active and polysilicon layers, for instance, can result in changes to the transistor parameters formed by these layers. These changes to the transistor parameters and parasitic capacitances due to manufacturing variations must be accounted for during design.

Figure 6:
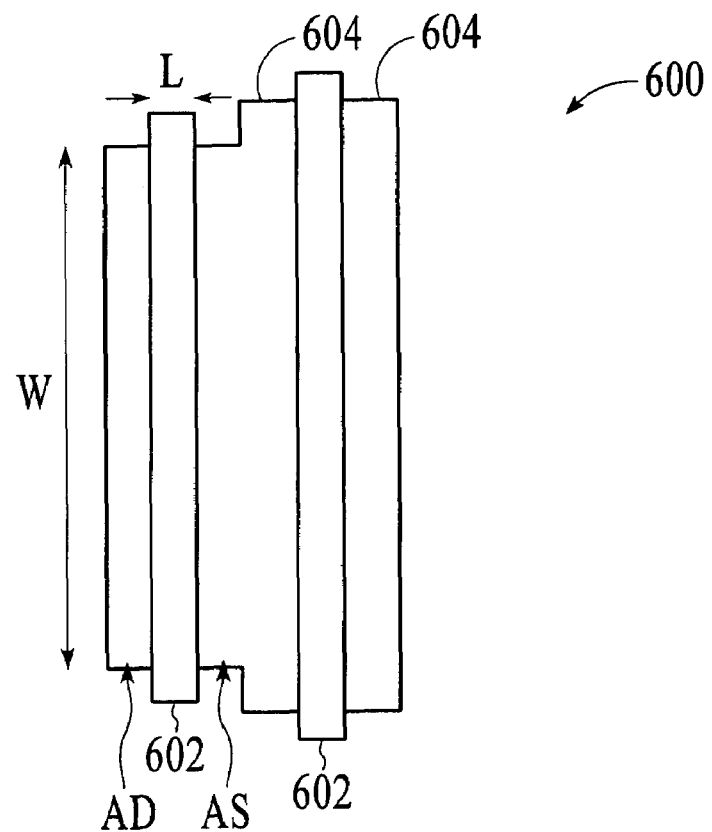
FIG. 6 shows a parameterized representation of a MOS transistor with Manhattan geometry.

The DFM systems of an embodiment model device variation as described in detail below. Devices such as metal oxide semiconductor (MOS) transistors are analyzed with the aid of a circuit simulator (referred to in industry parlance as Simulation Program with Integrated Circuits Emphasis (SPICE)) and circuit representations (referred to as netlists). For the purposes of a SPICE analysis, the MOS transistor is represented by a compact parameterized device model which models its current-voltage (I-V) characteristics. Such a model could be, but is not limited to, the BSIM model. Several parameters of the device model are passed in a netlist to represent the geometric attributes of the device model. The geometric attributes include width (W), length (L), drain area (AD) and source area (AS) to name a few. FIG. 6 shows a parameterized representation 600 of a MOS transistor with Manhattan geometry. This representation shows the schematic of a drawn device 600, with Manhattan geometry, comprising overlapping layers of polysilicon 602 and active diffusion 604. The overlapping region of diffusion 604 and polysilicon 602 is referred to as the device gate. The diffusion outside the gate area on either side of the gate is referred to as source and drain of the device.

Figure 7:
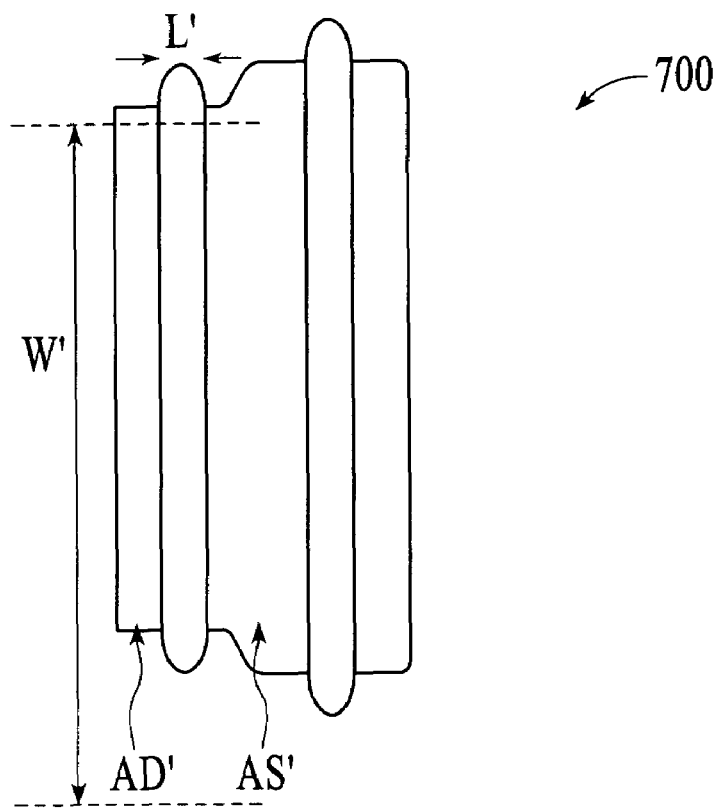
FIG. 7 shows a MOS transistor with shape distortions or variations represented by bounding box parameters.

A fundamental limitation of the device model of a MOS transistor as it is typically used in a SPICE analysis is that it is assumed to be of Manhattan geometry and defined with a Manhattan length (L) and width (W). However, in modern process technologies, gates may have shape distortions in both the polysilicon and diffusion layers varying across the device width. FIG. 7 shows a MOS transistor 700 with shape distortions or variations represented by bounding box parameters. Conventional SPICE simulation and SPICE modeling methodologies do not support this type of device and must model it according to the parameters of the device bounding box. This is inaccurate and is not guaranteed to capture the true behavior of the underlying device.

Figure 8:
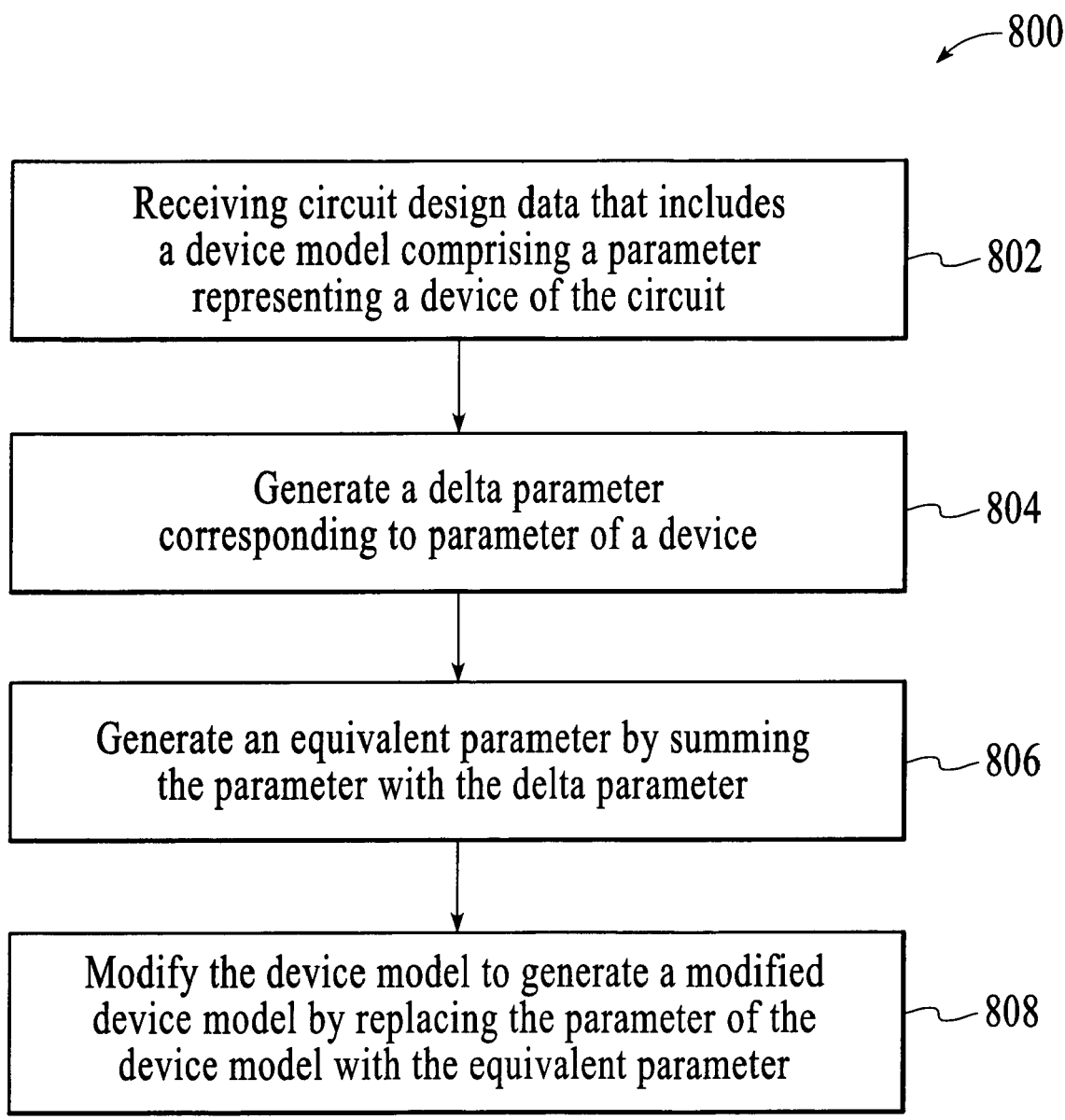
FIG. 8 is a flow diagram for modeling device variations, under an embodiment.

FIG. 8 is a flow diagram for modeling 800 device variations, under an embodiment. Operation begins by receiving 802 design data of a circuit. The design data includes device models comprising one or more parameters. The parameters represent one or more devices of the circuit. A delta parameter is generated 804 corresponding to a parameter of a device.

The delta parameter is generated to preserve operational behavior of the device under an operating condition. An equivalent parameter is generated 806 by summing the parameter with the delta parameter. The equivalent parameter accounts or compensates for spatial variations in the device. The device model is modified 808 to generate a modified device model by replacing the parameter of the device model with the equivalent parameter. The modeling of device variations is described in more detail below.

To account for spatial variations in the device the DFM systems of an embodiment include a method that represents these spatial variations using equivalent netlist parameters, $L_{new}$, $W_{new}$, $AD_{new}$, $AS_{new}$. These equivalent parameters are computed as equivalent changes to the device bounding box parameters, L', W', AD' and AS' as $$L_{new} = L' + \Delta L$$

$$W_{new} = W' + \Delta W$$

$$AD_{new} = AD' + \Delta AD$$

$$AS_{new} = AS' + \Delta AS \quad (1)$$

The changes to length, width, drain area and source area parameters, $\Delta L$, $\Delta W$, $\Delta AD$ and $\Delta AS$ respectively, are calculated so as to preserve the correct behavior of the device under a particular operating condition. Alternatively, the SPICE model (e.g. BSIM) can be defined as a sub-circuit, and variables passed which would give the correct behavior for non-Manhattan shapes. As one example, BSIM variables could be XL, XW, VT0, U0 and ETA0. For different analyses of a circuit including such a device (e.g., for timing, noise, power), different changes to the device parameters can be determined so as to preserve the correct behavior of the circuit that includes these non-Manhattan shaped devices.

For the purpose of determining change to the device channel length, $\Delta L$, for a non-Manhattan shaped device, the existing, unmodified, SPICE model for a device with Manhattan geometry is used to determine a new effective device length which will give the correct gate delay, noise or power. For delay simulation, the critical device parameter is the on-state drain-source current, $I_{on}$. Using SPICE simulations with the existing SPICE model or directly from measurements on Silicon (extracted from devices with ideal Manhattan geometry), the DFM system of an embodiment constructs a table of on-state currents ($I_{on}$) for a range of gate lengths and widths. A physics-based equation for current density is postulated at each location y across the gate width $J_{on}(y)$ with unknown coefficients. This postulated equation includes all the relevant physics for current distribution, such as stress effect, dopant distributions, and device edge effect for example.

The postulated equation is symbolically integrated for current density across the gate width to obtain a closed-form equation for current as a function of gate width $I_{on}(W)$ with the same (unknown) coefficients. For each gate length, the on-state currents as a function of gate width (extracted from measurements or SPICE simulations) are used to fit the coefficients of the analytical equation $I_{on}(W)$. The coefficients are plugged back into the equation for $J_{on}(y)$ from which $I_{on}(W)$ was derived. A transistor with a gate length that varies across the device (due to manufacturing variations) is then partitioned into multiple devices whose widths are equal to the partition width and whose lengths are equal to the geometric gate length for that partition. For each partition the DFM system uses a lookup to identify or locate the equation for current density as a function of the geometric gate length of that partition. The equation for current density $J_{on}(y)$ is integrated across that partition width to determine the current drawn by that partition. To determine the total current drawn by the entire device, a summation is made of the current of each partition. For this total current, a Manhattan gate length is found, from the pre-characterized table of current as a function of netlist variables, such as L and W, which matches the total current drawn by the device with shape distortion. Alternatively, the original netlist gate length can be used but a new parameter, say XL and XW, is passed to the SPICE model through a sub-circuit.

The new gate length $L_{new}$ determined above represents the new equivalent gate length that preserves the total current and therefore the delay across the device. For the purpose of noise analysis, a similar transformation of the channel length is applied to preserve the correct threshold voltage ($V_t$) or output resistance ($R_{on}$) of a device. Also, for the purpose of leakage analysis, a transformation preserves the correct off-state current ($I_{off}$) drawn by the device.

Besides modifications to the channel length, simple geometrical calculation of the non-Manhattan poly/diffusion overlap perimeter yields the change in device width, $\Delta W$. Likewise, the area of non-Manhattan source and drain geometries yield the change in drain area $\Delta AD$ and the change in source area $\Delta AS$, respectively, under spatial variation. Gate capacitance and overlap capacitance can also be treated by modifying the SPICE model parameters (e.g. DLC or CGD0 in BSIM), or by adding capacitors to the netlist that reflect the difference in capacitance between the ideal shape and the non-Manhattan shape.

The DFM systems of an embodiment model interconnect variations as described in detail below. The distortion to a wire shape can alter for example its resistance, capacitance to ground, and capacitance to neighboring wires. To model the impact of shape variations on the electrical characteristics of interconnects the DFM system of an embodiment calculates the change in wire resistance $\Delta R$ and change in capacitance $\Delta C$ due to the shape variation or predicted shape variation. This change in capacitance and resistance is computed in a distributed fashion so that the resulting interconnect is represented as a distributed RC network. Each modified resistance and capacitance parameter of the distorted wire shape is then computed as $R+\Delta R$ and $C+\Delta C$ respectively.

Figure 9:
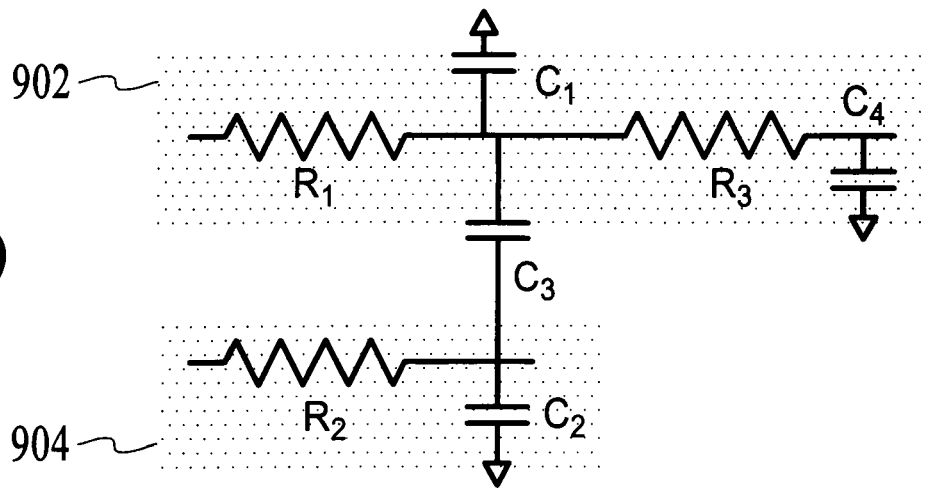
FIG. 9 shows two Manhattan-shaped wires electrically connected through a distributed RC network calculated using ideal drawn layout shapes.
Figure 10:
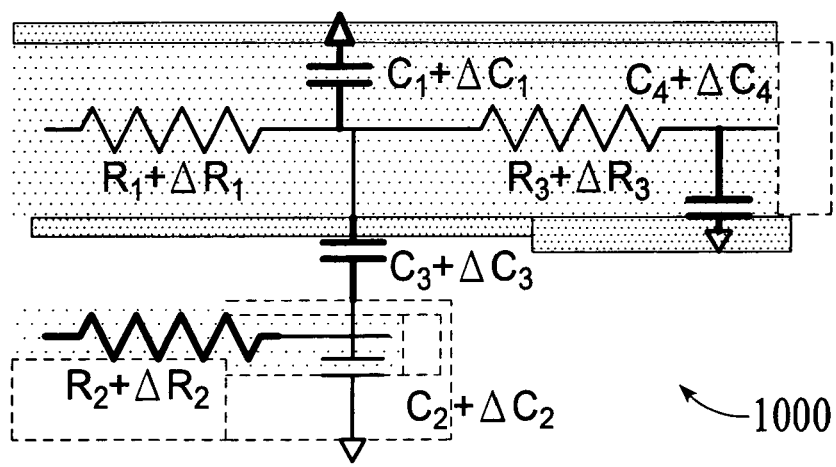
FIG. 10 shows the interconnect under spatial variation with parasitic changes ($\Delta R$ and $\Delta C$) due to shape distortion annotated to corresponding RC parameters, under an embodiment.

As an example of interconnect modeling, FIG. 9 shows two Manhattan-shaped interconnects 902 and 904 or wires electrically connected through a distributed RC network calculated using ideal drawn layout shapes. The DFM system models interconnects to include the impact of shape variation of the interconnects. As an example of modeling that includes factors to account for shape variations predicted to result from manufacturing, FIG. 10 shows the interconnect 1000 under spatial variation with parasitic changes ($\Delta R$ and $\Delta C$) due to shape distortion annotated to corresponding RC parameters, under an embodiment.

Figure 11:
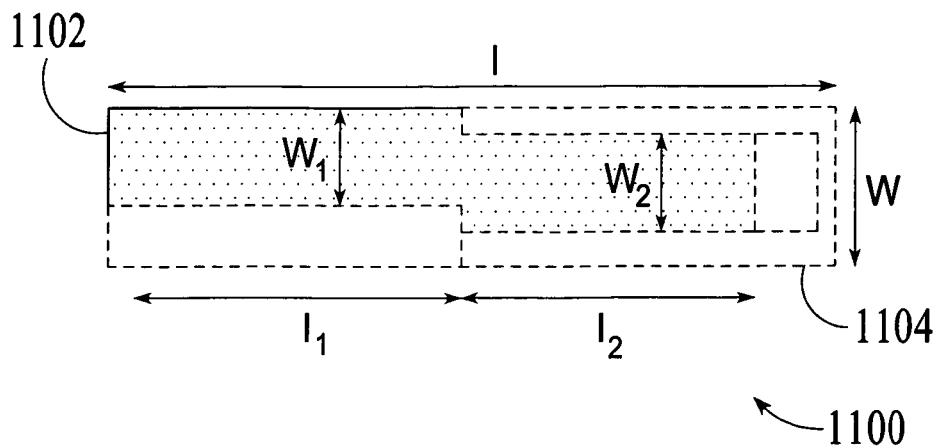
FIG. 11 shows a segmented interconnect including two sub-segments with shape variations represented by sub-segment widths ($w_1, w_2$) and lengths ($l_1$ and $l_2$), under an embodiment.

To calculate the change in wire resistance $\Delta R$ the DFM system partitions the wire into rectangular sub-segments with each subsection represented by a width $w_i$ and length $l_i$. The resistance per square of the wire sub-segment due to its intrinsic material property $R_{psq}(w_i)$ can be different for each wire sub-segment and is assumed known. FIG. 11 shows a segmented interconnect 1100 including two sub-segments 1102 and 1104 with shape variations represented by sub-segment widths ($w_1$, $w_2$) and lengths ($l_1$ and $l_2$), under an embodiment. The change in resistance for the two sub-segment interconnect or wire 1100 is calculated as:

$$\Delta R = \frac{R_{psq}(w)*l}{w} - \frac{R_{psq}(w_1)*l_1}{w_1} - \frac{R_{psq}(w_2)*l_2}{w_2}. \quad (2)$$

To calculate the change in wire capacitance due to shape variation, the DFM system of an embodiment uses a hybrid analytical-numerical method. First, the interconnect sub-segments and its neighbors to which capacitance is to be calculated are partitioned into n panels of smaller dimensions. FIG. 12 shows interconnect sub-segments 1200 partitioned into panels 1202, under an embodiment.

The coefficient of potential at every panel due to a unit charge placed on every other panel is then calculated and stored in a n×n dense matrix, referred to as the coefficient of potential matrix and shown below as equation (3). Each coefficient of potential in the matrix is derived from the analytical Green's function for a multi-layer medium (comprising possibly different dielectrics) using the separation of variables technique, but is not so limited. The Green's function yields the potential at any point in a multi-layer stack given a unit charge placed at any point also in the multi-layer stack. Note that an arbitrary number of dielectric layers may exist between the neighboring wire geometries. The n×n coefficient of potential matrix is then inverted to give the capacitance matrix between the panels as shown below in equation (4). The capacitance between any two conductor sub-segments $C_{ij}$ is determined by adding together the capacitances between the corresponding panels of the sub-segments as shown below in equation (5).

$$\begin{bmatrix} P_{11} & P_{12} & \ldots & P_{1n} \\ P_{21} & P_{22} & \ldots & P_{2n} \\ \ldots & \ldots & \ldots & \ldots \\ P_{n1} & P_{n2} & \ldots & P_{nn} \end{bmatrix} \begin{bmatrix} q_1 \\ q_2 \\ \ldots \\ q_n \end{bmatrix} = \begin{bmatrix} v_1 \\ v_2 \\ \ldots \\ v_n \end{bmatrix} \quad (3)$$

$$\begin{bmatrix} P_{11} & P_{12} & \ldots & P_{1n} \\ P_{21} & P_{22} & \ldots & P_{2n} \\ \ldots & \ldots & \ldots & \ldots \\ P_{n1} & P_{n2} & \ldots & P_{nn} \end{bmatrix}^{-1} = \begin{bmatrix} C_{11} & C_{12} & \ldots & C_{1n} \\ C_{21} & C_{22} & \ldots & C_{2n} \\ \ldots & \ldots & \ldots & \ldots \\ C_{n1} & C_{n2} & \ldots & C_{nn} \end{bmatrix} \quad (4)$$

$$C_{ij} = \sum_{m \in i} \sum_{n \in j} C_{mn} \quad (5)$$

The DFM system can use a lookup table of pre-characterized capacitance equations to accelerate computation of the capacitance between neighboring wires on interconnect configurations seen frequently on an actual chip. Such a lookup table is constructed using pre-determined wire configurations with parameterized wire widths, wire thicknesses and spacing between wires. FIG. 13 shows parameterized neighboring interconnect or wire configurations 1300 for use in pre-characterizing capacitance, under an embodiment.

By solving the wire configuration for capacitance as described, a lookup table is constructed for the capacitance as a function of the parameters of the wire configuration including wire width, thickness, and spacing. FIG. 14 is a table (parameterized) 1400 of capacitance equations for characterizing capacitance of the interconnect relative to neighboring wires and to ground, under an embodiment. Each entry in the lookup table is a physical equation for coupling capacitance between neighboring wires and for ground capacitance between the wire and ground. The coefficients of the equations are determined by numerical fitting of the equations to the capacitance values calculated using equation (3), equation (4) and equation (5) described above.

Considering an actual design for a particular interconnect configuration, the capacitance change ΔC to change in interconnect width, spacing and thickness is determined by evaluating the appropriate equations in the lookup table described above. If the interconnect configuration of the design does not match the interconnect configuration that was characterized, the techniques described above with reference to FIG. 10 and equations (3), (4), and (5) is used directly on the design geometries to determine the change in capacitance ΔC.

The DFM systems of an embodiment provide circuit design timing analysis and noise analysis that incorporate device variations and interconnect variations as described in detail herein. In a design that is created using synthesis, place and route tools, the transistors belong inside a group of transistors called a standard cell. Each standard cell in a library of such cells is typically pre-characterized for timing, noise and power. When the design is created during place and route, instances of the standard cells are assembled and wired together. To determine if the design meets its timing specification, a static timing analysis is performed wherein the delay across each instance of a standard cell is computed using the pre-characterized timing model of that cell and the wire parasitics that that instance drives. Once the delays for all standard cell instances in the design are calculated, a topological traversal of the design is performed to determine if the actual signal arrival time at all instance pins meets the required arrival time, as governed by the required frequency of operation of the design and by race conditions through flip-flops. Additionally, to ensure that the design meets noise specifications, a signal integrity analysis is performed to ensure that coupling noise between wires does not cause functional failures at registers and latches.

The impact of manufacturing variations on devices is layout context dependent. Therefore, in every instance of a standard cell, depending on neighboring cell instances, devices exhibit different manufacturing variations and therefore have different electrical parameters. Consequently, the conventional assumption in a timing or noise analysis flow that every instance of a cell behaves identically is violated. One possible solution to this problem is to treat each standard cell in the context of its neighbors as unique. Clearly, this would lead to an explosion in the number of "unique" standard cells in a library requiring far greater pre-characterization of standard cell libraries than is computationally feasible.

The DFM system of an embodiment includes an alternate methodology that predicts the impact of manufacturing variations on each unique instance of the standard cell without resorting to pre-characterization of that unique instantiation. In the context of the design, the DFM system determines the timing or noise behavior of each instance of a standard-cell, given its input waveforms and wire load, using a fast simulation of that cell's transistors with appropriately modified device parameters to reflect manufacturing variations. Note that the wire load that the standard cell instance drives is also modified to include manufacturing variation induced parasitic changes. The circuit design is traversed in a topological breadth-first order starting from the primary inputs of the design where the input waveforms are known and given by the user. Each instance, as it is traversed, has its input waveforms predetermined (due to the breadth-first nature of traversal). The traversed instance is simulated with the modified cell transistors (having modified parameters) driving the modified wire load (having modified parasitics). The resulting delay across the cell instance and the waveform at its output are registered. The output waveforms are used to drive the next instance in the topological traversal while the delay is stored for subsequent timing and noise check calculation.

To accelerate the simulation of each instance, it is possible to replace the transistors in the instance with a pre-characterized model that predicts the output characteristics of the instance given the change in transistor parameters within the cell of that instance. Such a pre-characterized model can be constructed for each unique cell in the library and can be a representation of the output voltage characteristics and/or the output current characteristics of the cell given a change in transistor parameters within the cell.

To further simplify the task of calculating the impact of manufacturing variations on timing and noise performance of the design, the DFM system of an embodiment relies on a nominal timing and noise analysis of the design using its ideal drawn shapes. The results of this nominal analysis are used to prune or reduce the number of nets or instances that need to be analyzed for timing and noise impact from manufacturing variations. For timing analysis, such pruning is accomplished by examining the timing slack (difference between signal required time and signal arrival time) of all instance pins from the nominal timing analysis to determine which instances are to be analyzed and which instances are not to be analyzed. If the largest timing slack of all pins of an instance from the nominal analysis is significantly larger than the maximum likely impact of manufacturing variations on any path involving that instance's pins, then that instance may be safely ignored during the subsequent analysis incorporating manufacturing variations.

Similarly for noise analysis, the pruning is accomplished by examining the noise on all nets as reported by the nominal noise analysis (e.g., noise analysis on the design using ideal drawn shapes). If the noise on a net from the nominal analysis is larger than a given threshold, then that net is analyzed to incorporate the impact of manufacturing variations. If the noise determined from the nominal analysis is below the threshold the net can be ignored during the subsequent analysis to incorporate the impact of manufacturing variations. The noise threshold for each cell is a function of the threshold voltage of transistors in the cell and can be determined a priori through pre-characterization of that cell.

Figure 15:
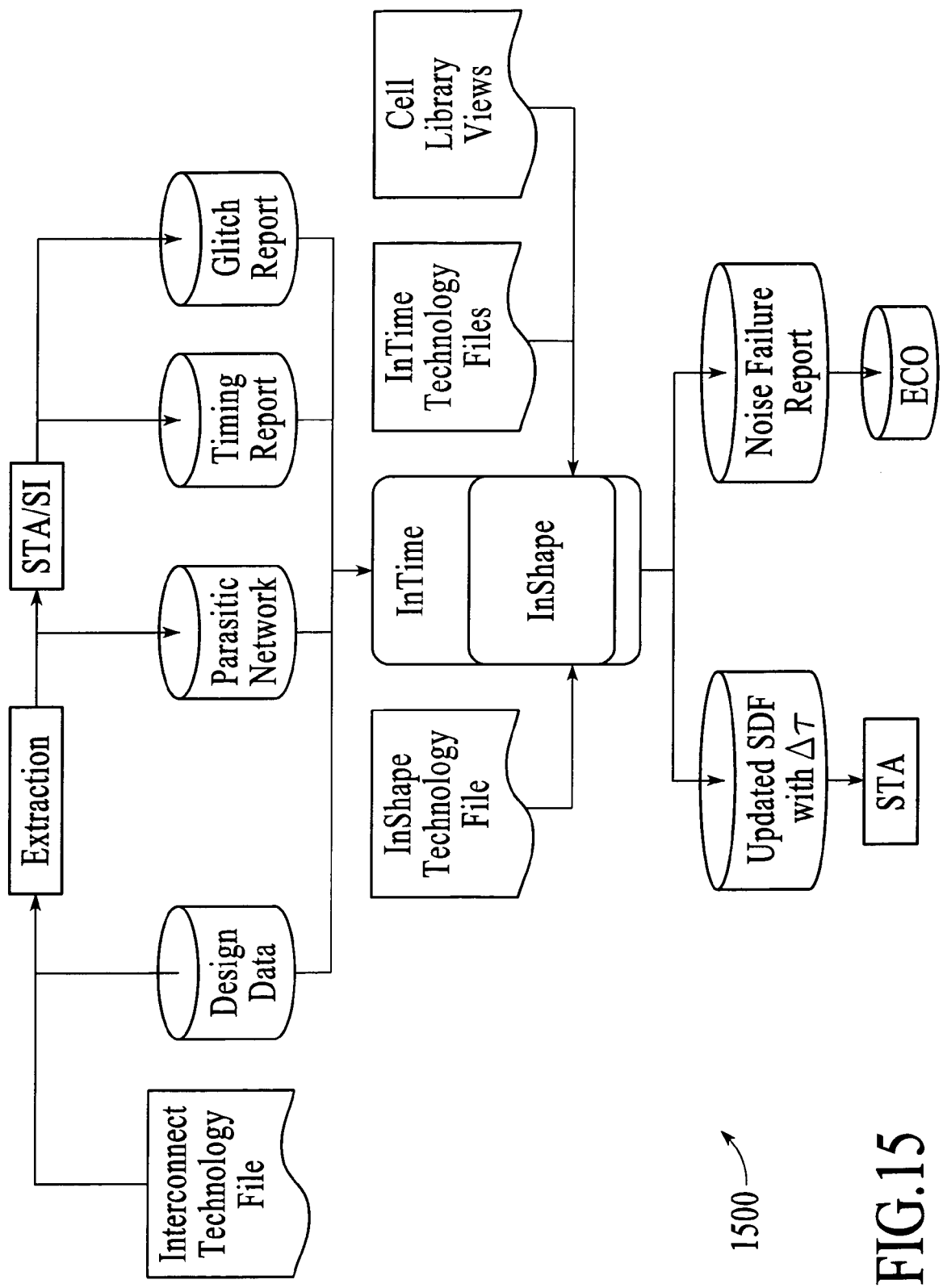
FIG. 15 is a flow diagram for incorporating manufacturing variations (e.g. device variations, interconnect variations, etc.) into integrated circuit timing and signal integrity (noise) analysis, under an embodiment.

FIG. 15 is a flow diagram 1500 for incorporating manufacturing variations (e.g. device variations, interconnect variations, etc.) into integrated circuit timing and signal integrity (noise) analysis, under an embodiment. A nominal analysis of the design data is performed using extraction, timing and noise analysis on the ideal (drawn) shapes. Extraction produces or generates the parasitic network (e.g. RC network) associated with the drawn shapes. A static timing analyzer (STA) operates with information resulting from the extraction to generate a timing report that includes the timing slack of all nets and instance pins. Furthermore, nominal signal integrity (SI) analysis produces a glitch report containing noise values and waveforms of all nets in the circuit design.

Figure 16A:
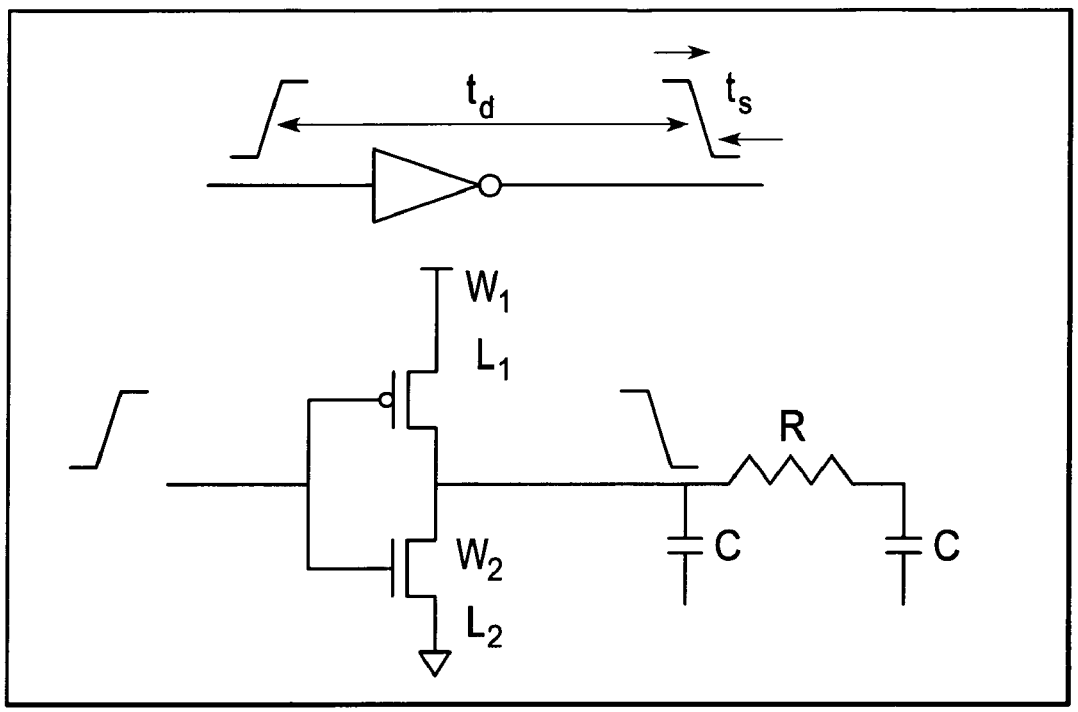
FIG. 16A shows a standard cell with nominal device parameters and wire parasitics exhibiting nominal delay $t_d$ and slew $t_s$.

A tool referred to herein as InTime receives information including one or more of the circuit design data, the parasitic network, the timing report, and the glitch report. The InTime tool or component prunes the nets and instances to be analyzed, calculates the shape variation on the wires and transistors associated with these pruned nets and instances, and calculates change in timing due their shape variation. This change in timing due to manufacturing variation is calculated as a change in delay $\Delta \tau$ between the cell having nominal device parameters and wire parasitics and the modified cell having modified device parameters and wire parasitics. FIG. 16A shows a standard cell with nominal device parameters and wire parasitics exhibiting nominal delay $t_d$ and slew $t_s$.

Figure 16B:
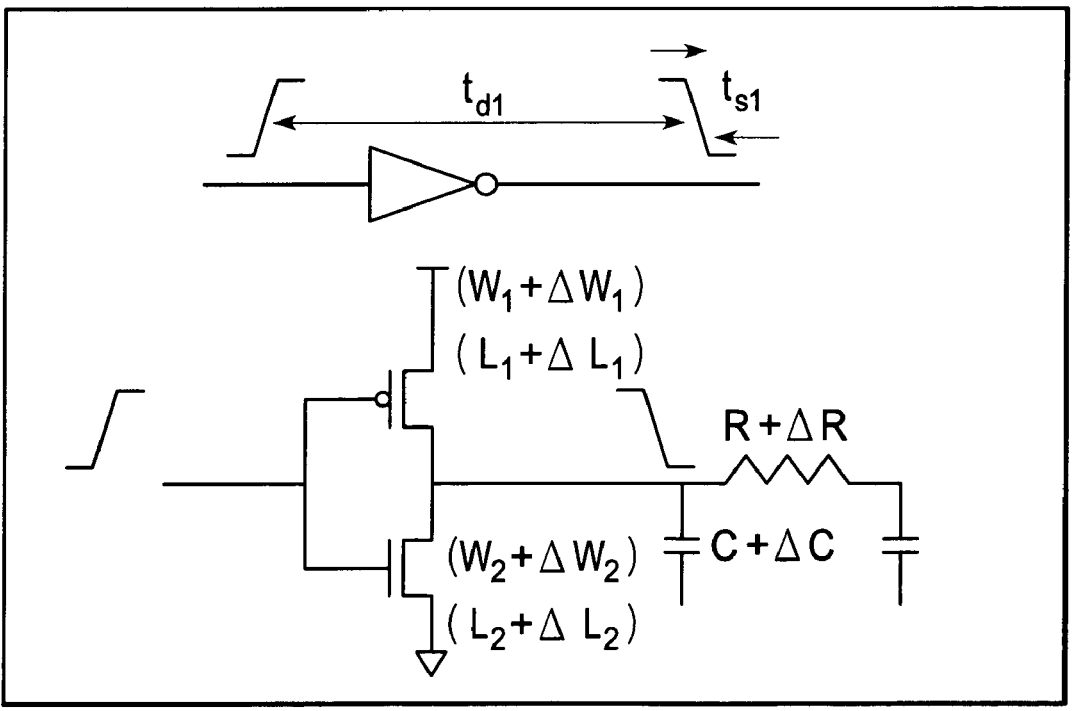
FIG. 16B shows a modified cell with device parameters and wire parasitics considering manufacturing variations exhibiting modified delay $t_{d1}$ and slew $t_{s1}$, under an embodiment.

FIG. 16B shows a modified cell with device parameters and wire parasitics considering manufacturing variations exhibiting modified delay, $t_{d1}$ and slew, $t_{s1}$. The change in delay $\Delta \tau$ is calculated as $$\Delta \tau = t_{d1} - t_d. \tag{6}$$

The incremental delay is written out as an incremental delay file which can be imported into a static timing analyzer to account for the changes in timing due to the shape variations.

Figure 17A:
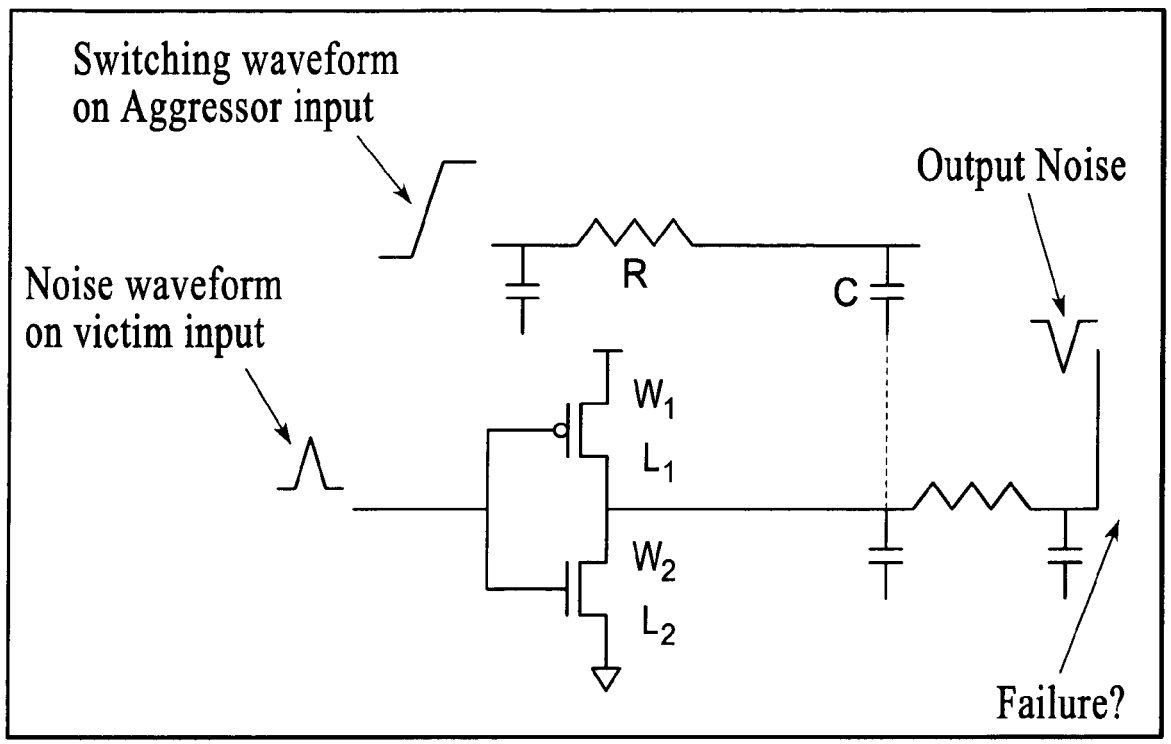
FIG. 17A shows a standard cell with nominal device parameters and wire parasitics exhibiting nominal noise at its output due to input noise and switching aggressor.
Figure 17B:
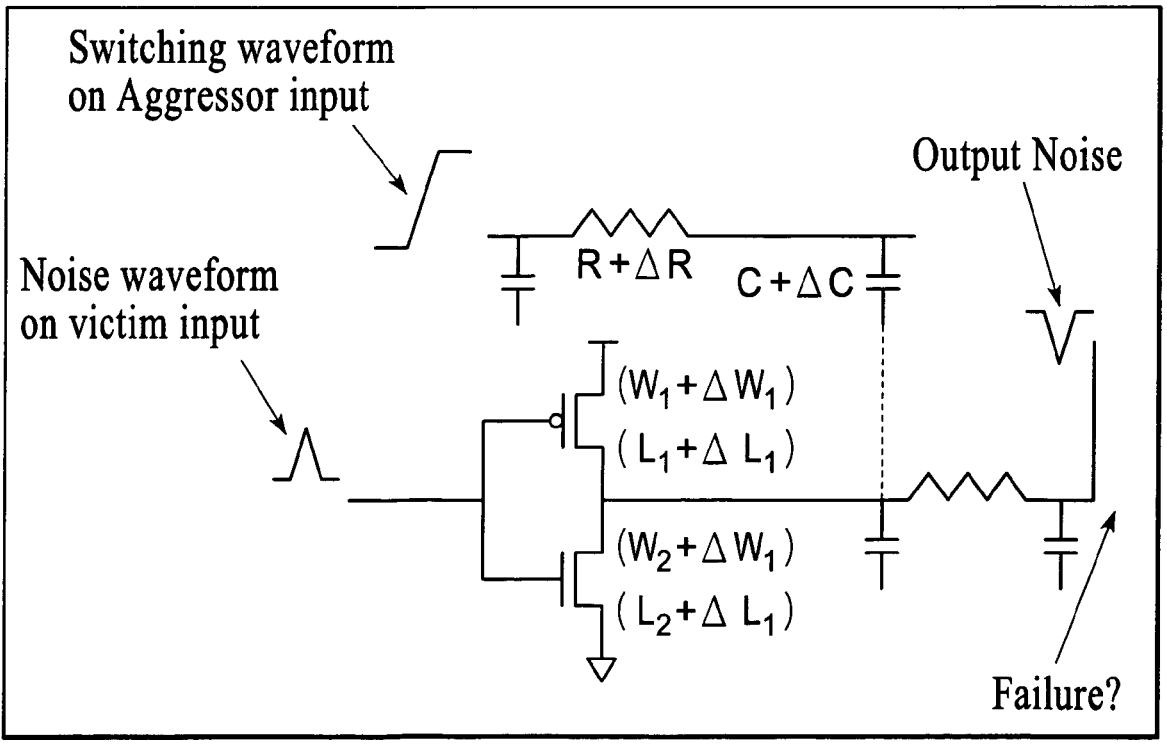
FIG. 17B shows a modified cell with modified device parameters and wire parasitics considering manufacturing variations exhibiting modified noise at its output due to input noise and switching aggressor, under an embodiment.

The change in noise behavior of the nets and instances due to the predicted manufacturing shape variations is also calculated using a noise analysis as described above. FIG. 17A shows a standard cell with nominal device parameters and wire parasitics exhibiting nominal noise at its output due to input noise and switching aggressor. FIG. 17B shows a modified cell with modified device parameters and wire parasitics considering manufacturing variations exhibiting modified noise at its output due to input noise and switching aggressor, under an embodiment. After the noise analysis, a comparison of the noise magnitude at the output of the cell instance determines whether it causes a functional failure or not. Noise analysis of the modified cell with modified device parameters and wire parasitics yields an output noise waveform that could be significantly different from that of the nominal noise analysis of the standard cell thereby resulting in new functional noise failures. New noise failures are flagged in an output file and directives to repair these noise failures (using buffer insertion or driver resizing) are written out as Engineering Change Order (ECO) commands for place and route tools.

The DFM systems of an embodiment provide circuit design leakage analysis that incorporates device variations as described in detail herein. Manufacturing variations on the polysilicon layer of a transistor results in changes to the transistor gate length which can result in sizeable changes in the off-state leakage current drawn by the gate. Manufacturing data has shown variations in leakage current of almost 300% for a 10% variation in poly gate length at a poly gate length (after etching) of 50 nm which corresponds to a drawn gate length of 120 nm.

Figure 18:
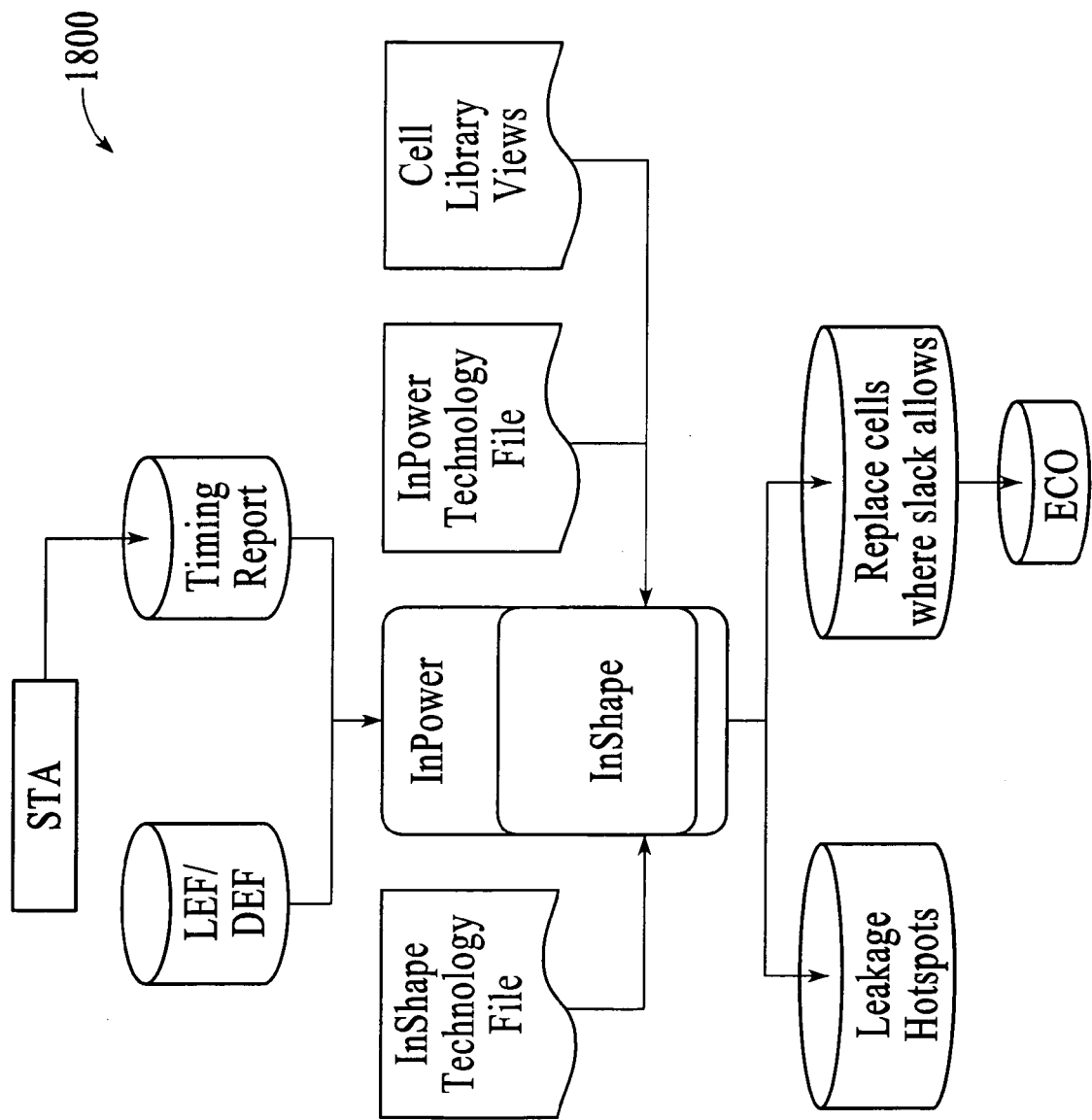
FIG. 18 is a flow diagram for incorporating manufacturing variations (e.g. device variations, interconnect variations, etc.) into integrated circuit leakage power analysis, under an embodiment.

FIG. 18 is a flow diagram 1800 for incorporating manufacturing variations (e.g. device variations, interconnect variations, etc.) into integrated circuit leakage power analysis, under an embodiment. Incorporating the variations into the leakage power analysis captures the impact of shape variation induced leakage of transistors in a design built with standard cells.

A tool referred to herein as InPower receives information including one or more of the design database (LEF/DEF) and standard cell library views, and the timing report from a nominal timing analysis of the design (using ideal drawn shapes). The shape distortions on the transistors in every instance of a standard cell are calculated and the change in off-state current drawn by that instance due to shape variation is calculated. This change in leakage power due to manufacturing variation is calculated as a change in power $\Delta P$ between the standard cell with nominal device parameters and the modified cell with modified device parameters. The change in power $\Delta P$ is calculated as $$\Delta P = I_{off1} - I_{off2}. \tag{7}$$

Figure 19A:
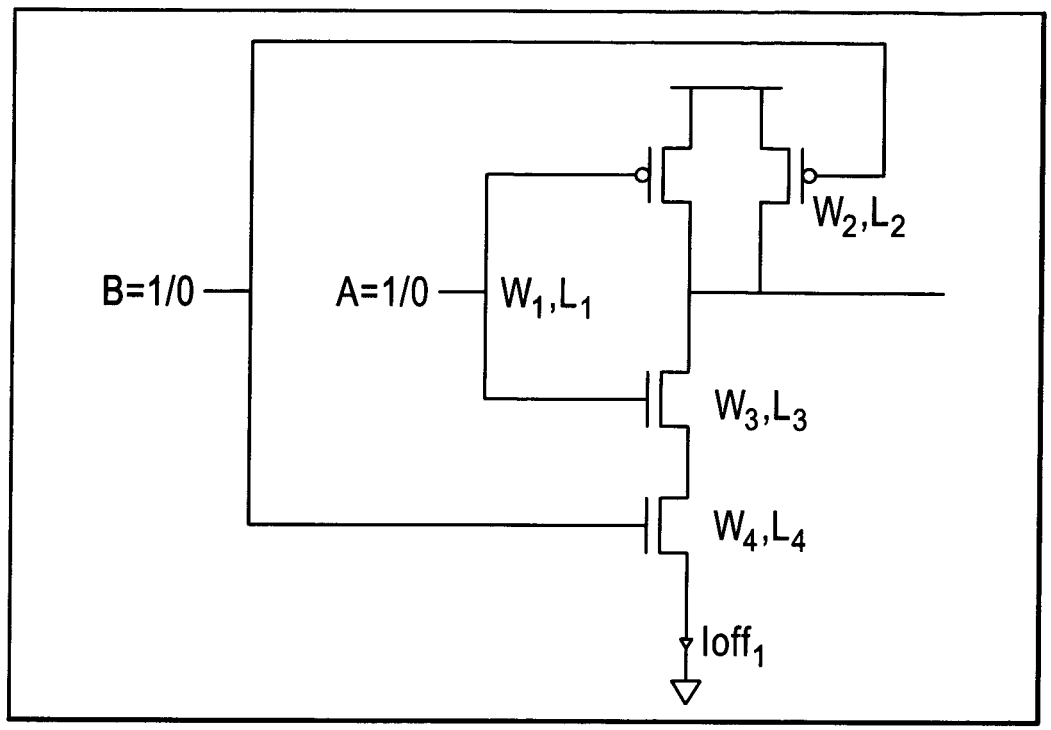
FIG. 19A shows a standard cell with nominal device parameters drawing leakage current $I_{off1}$.
Figure 19B:
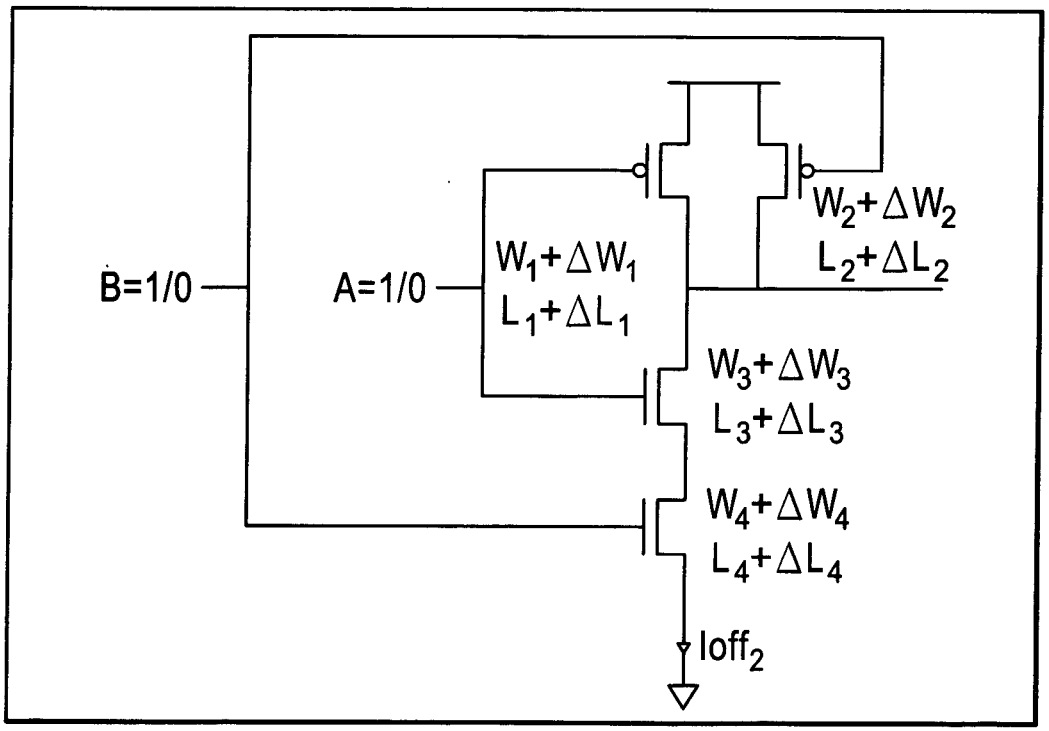
FIG. 19B shows a modified cell with modified device parameters considering manufacturing variations drawing leakage current $I_{off2}$, under an embodiment.

The leakage power for each instance of a cell is determined with and without shape distortions using a fast simulation of that cell's transistors with nominal device parameters and modified device parameters respectively. To accelerate the simulation of each instance, it is possible to replace the transistors in the instance with a pre-characterized model that predicts the off-state current drawn by the instance given the change in transistor parameters within the cell of that instance. Such a pre-characterized model can be constructed for each unique cell in the library and can be a representation of the power supply current characteristics of the cell given a change in transistor parameters within the cell. FIG. 19A shows a standard cell with nominal device parameters drawing leakage current $I_{off1}$. FIG. 19B shows a modified cell with modified device parameters considering manufacturing variations drawing leakage current $I_{off2}$, under an embodiment.

In calculating the leakage power consumed by an instance of a cell, the DFM system of an embodiment considers information of the logic state at which each of the instance input pins will be held. Depending on its input logic states, the leakage power drawn by a cell instance can be significantly different. In computing the leakage drawn by a cell instance, the weighted average of leakage across all the states that can possibly occur is calculated. For a two-input gate for example there are four possible input states, including state 00, state 01, state 10, and state 11. The leakage for such a gate is computed as $$P_{AB} = (p_{00} \times (P_{00})) + (p_{01} \times (P_{01})) + (p_{10} \times (P_{10})) + ((p_{11}) \times (P_{11})) \quad (8)$$

The term $P_{AB}$ represents the average leakage power drawn by the two-input gate, and $P_{00}$ represents the leakage current drawn in the 00 state (e.g. A=0, B=0) and $p_{00}$ corresponds to the probability of occurrence of the 00 state.

Figure 20:
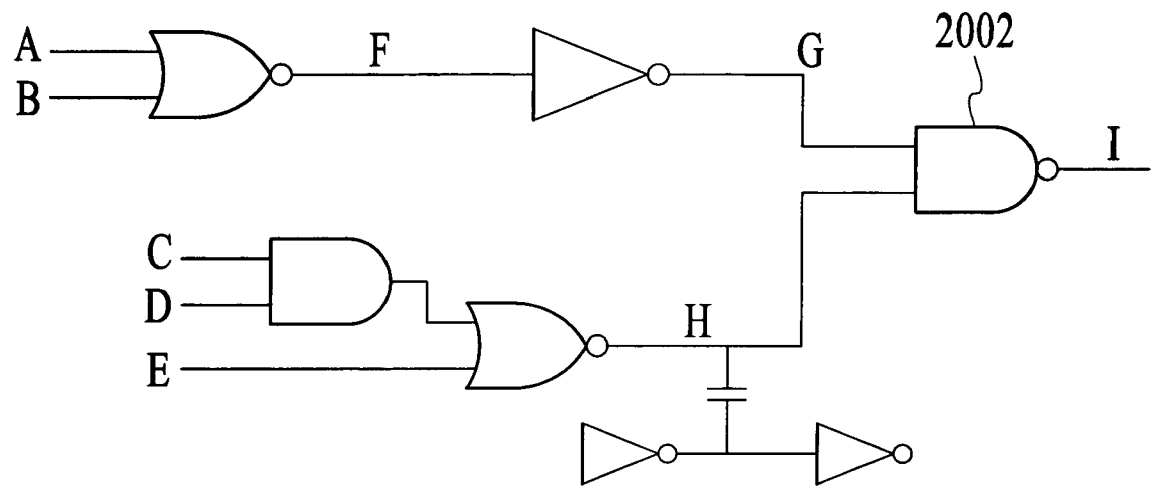
FIG. 20 shows a connectivity graph of input state occurrence probability propagation for use in determining likelihood of occurrence of logic state 1 at a gate input, under an embodiment.
Figure 20:
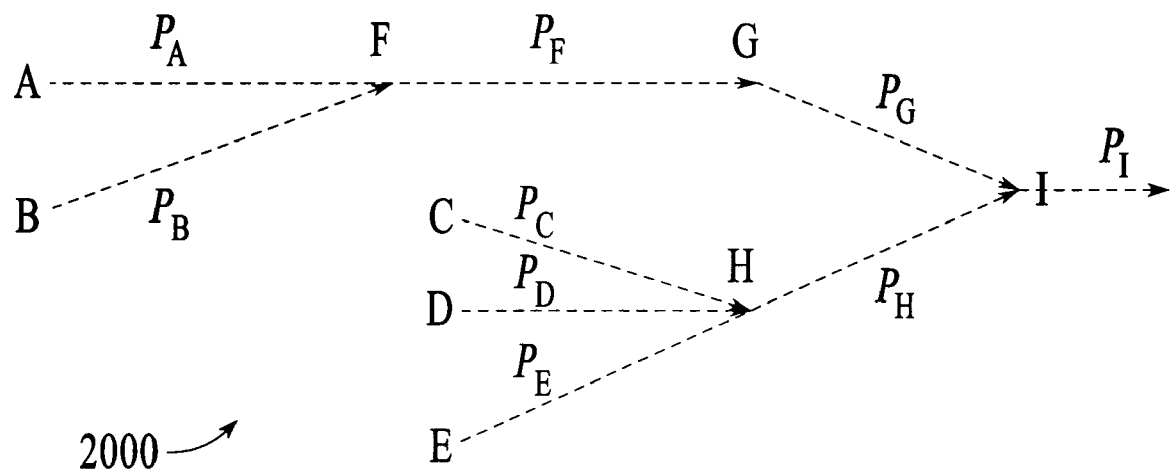

To determine the probability of occurrence of an instance's input state, a connectivity graph of the circuit design is constructed. FIG. 20 shows a connectivity graph 2000 of input state occurrence probability propagation for use in determining likelihood of occurrence of logic state 1 at a gate input, under an embodiment. The gate of this example is a two-input NAND gate 2002, but is not so limited. The circuit design is divided into cones of logic between flip-flops or registers. Starting with known occurrence probabilities of logic state 1 at the primary inputs and at flip-flop outputs (or using a probability of 0.5 as default), the occurrence probabilities are propagated down each gate in the cone of logic. Propagation of probability across a gate uses the logic function of the gate to determine the output occurrence probability as a function of the input occurrence probabilities. Input correlations are tracked during the probability propagation. Performance of the probability propagation generates information of the likelihood of occurrence of each state, which is used as described above. Therefore, the leakage for the two-input NAND gate 2002 described above is calculated as $$P_{NAND} = (1-p_G)(1-p_H)\cdot P_{00} + (1-p_G)\cdot p_H \cdot P_{01} + p_G \cdot (1-p_H) \cdot P_{10} + p_G \cdot p_H \cdot P_{11} \quad (9)$$

The terms G and H represent inputs of the NAND gate, $p_G$ is the probability that the input G is at logic state 1, and $p_H$ is the probability that the input H is at logic state 1.

An alternate way to calculate the probability of occurrence of a logic state at an instance's inputs is to perform logic simulations on the logic cone with random input vectors. The results of the logic simulations are sampled at each instance pin to determine the likelihood of occurrence of state '1' on that pin.

Once the state probabilities for each instance pin are calculated, weighted average values of leakage are computed for that instance. The leakage hotspots of the design are instances where the leakage consumed by the cell instance under analysis for manufacturing variations is significantly larger than that consumed by the nominal cell instance. Once these leakage hotspots are identified, they can be fixed by issuing ECO commands to replace the leaky cell with a cell that includes devices with higher effective channel lengths. Such a fix can be implemented only if there is sufficient timing slack of all pins of that instance to allow for the increase in delay associated with replacing the leaky cell with a slower one (cells with devices having larger channel lengths will be slower). The timing slack read in from the timing analysis of the nominal design described above allows for this determination.

Aspects of the DFM systems, described above, are described in terms of processes executed on an EDA computer system or other processing system. These processes are implemented as program code stored in machine-readable or computer-readable memory areas or devices of a computer system and are executed by the processor of the computer system.

Figure 21:
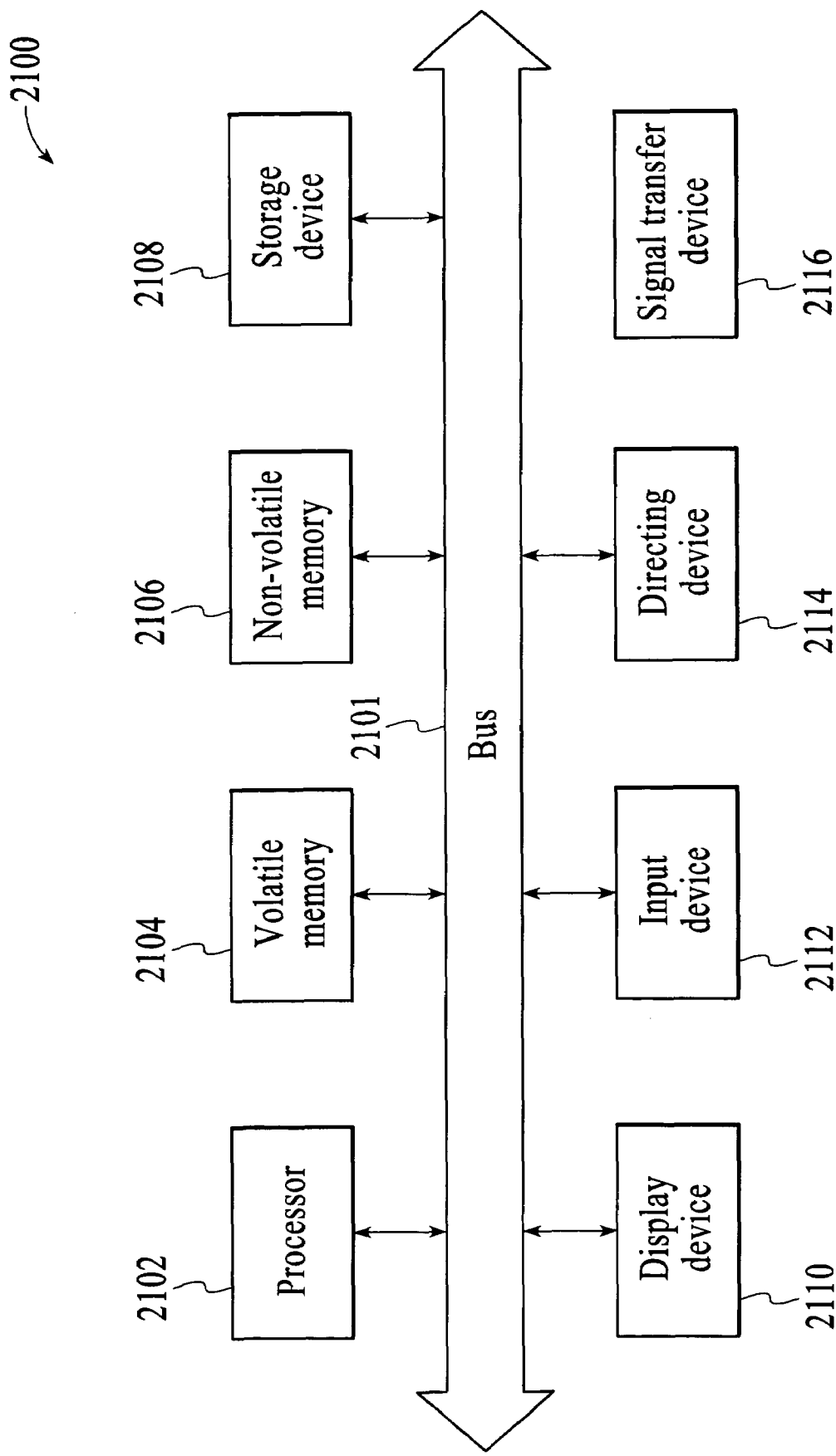
FIG. 21 is a computer system hosting a DFM system, under an embodiment.

Although a variety of different computer systems can be used with the DFM systems, FIG. 21 is a computer system 2100 hosting a DFM system under the embodiments described above. The computer system 2100 generally includes a central processor unit (CPU) or central processor 2102 for processing information and instructions, an address/data bus 2101 coupled to the CPU 2102 for communicating information, volatile memory 2104 (random access memory (RAM) for example) coupled to the bus 2101 for storing information and instructions for the CPU 2102, and non-volatile memory 2106 (read-only memory (ROM) for example) coupled to the bus 2101 for storing static information and instructions for the CPU 2102. The computer system 2100 may also include one or more optional storage devices 2108 coupled to the bus 2101 for storing information and instructions. The storage devices or data storage devices 2108 can include one or more removable magnetic or optical storage media which are computer-readable memories. Some combination of the volatile memory 2104, non-volatile memory 2106, and/or storage device 2108 include or store data structures describing components or processes of the IDMP described above, but the IDMP is not limited to storage in these devices.

The computer system 2100 may also include at least one optional display device 2110 coupled to the bus 2101 for displaying information to the users of the computer system 2100. The computer system 2100 of an embodiment may also include one or more optional input devices 2112 coupled to the bus 2101 for communicating information and command selections to the CPU 2102. Additionally, the computer system 2100 may include an optional cursor control or directing device 2114 coupled to the bus 2101 for communicating user input information and command selections to the CPU 2102. The computer system 2100 may also include one or more optional signal transfer devices 2116 (transmitter, receiver, modem, etc. for example) coupled to the bus 2101 for interfacing with other computer systems.

The DFM systems described herein include a method comprising receiving a circuit design of a circuit that includes devices and interconnects. The method of an embodiment includes determining a first variance in shapes of the interconnects and a second variance in shapes of the devices. The method of an embodiment includes converting the first variance to a parasitic variance and converting the second variance to a device variance. The method of an embodiment includes generating a modified circuit design by modifying at least a portion of the circuit design to include one or more of the parasitic variance and the device variance. The method of an embodiment includes determining a predicted variation in a performance parameter of a manufactured version of the circuit by simulating operation of the modified circuit design.

The method of an embodiment comprises modifying the circuit using the predicted variation.

The predicted variation of an embodiment includes a predicted variation resulting from manufacturing the IC.

The parasitic variance of an embodiment includes a resistance variation.

The method of an embodiment comprises determining the resistance variation by discretizing the interconnects into rectangular subsegments. Each subsegment of an embodiment is represented by at least one dimension. The method of an embodiment comprises calculating a change in resistance for each subsegment using the at least one dimension and an intrinsic resistance. The intrinsic resistance of an embodiment results from an intrinsic material property of the interconnect.

The parasitic variance of an embodiment includes a capacitance variation.

The method of an embodiment comprises determining the capacitance variation by discretizing each interconnect into rectangular subsegments. Each subsegment of an embodiment is represented by at least one dimension. The method of an embodiment comprises discretizing the subsegments into a plurality of panels. The method of an embodiment comprises calculating a coefficient of potential at each panel due to a unit charge placed on every other panel of the plurality of panels.

The method of an embodiment comprises generating a potential matrix that includes coefficients of potential of all panels of each interconnect. The method of an embodiment comprises generating a capacitance matrix by inverting the potential matrix. The capacitance matrix of an embodiment includes capacitances of all panels of the interconnect. The method of an embodiment comprises determining capacitance between any pair of subsegments by summing capacitances between corresponding panels of the subsegments using information of the capacitance matrix.

The method of an embodiment comprises determining the capacitance variation by generating a first lookup table including interconnect configuration data. The method of an embodiment comprises determining a capacitance corresponding to the interconnect configuration data. The method of an embodiment comprises generating a second lookup table for the capacitance as a function of the interconnect configuration data. Each entry of the second lookup table of an embodiment is an equation for coupling capacitance between adjacent ones of the interconnects and for ground capacitance between a corresponding interconnect and ground.

The interconnect configuration data of an embodiment comprises a dimensional parameter, the dimensional parameter including one or more of width, thickness, and spacing.

The performance parameter of an embodiment includes timing.

The timing of an embodiment includes a signal timing delay.

The performance parameter of an embodiment includes signal integrity.

The signal integrity of an embodiment includes one or more of threshold voltage and output resistance of the devices.

The performance parameter of an embodiment includes power consumption.

The power consumption of an embodiment includes off-state current drawn by the devices.

Determining the predicted variation of an embodiment includes generating a modified standard cell by applying one or more of the parasitic variance and the device variance to a standard cell of the circuit design. Determining the predicted variation of an embodiment includes determining the predicted variation using information of simulated behavior of the modified standard cell in response to the applying.

The method of an embodiment comprises generating incremental delay files that include information of the predicted variation. The performance parameter of an embodiment includes timing.

The method of an embodiment comprises generating one or more of noise failure resizing commands and buffer insertion/driver resizing commands that include information of the predicted variation. The performance parameter of an embodiment includes signal integrity.

The method of an embodiment comprises generating leakage power hotspots and cell substitution commands that include information of the predicted variation. The performance parameter of an embodiment includes power consumption.

The method of an embodiment comprises modifying the circuit using the predicted variation.

Modifying of an embodiment includes controlling at least one Electronic Design Automation tool using information of the predicted variation.

The method of an embodiment comprises selecting a set of standard cells of the circuit design for which to determine the predicted variation. The standard cells of an embodiment are selected from a plurality of standard cells that form the circuit design.

The method of an embodiment comprises performing a timing analysis of the plurality of standard cells. The timing analysis of an embodiment generates a timing slack of each standard cell. The timing analysis of an embodiment is performed before generating the modified circuit design. The method of an embodiment comprises selecting for the set any standard cell for which the timing slack is below a first threshold.

The method of an embodiment comprises performing a noise analysis of the plurality of standard cells. The noise analysis of an embodiment generates a noise value of each standard cell. The noise analysis of an embodiment is performed before generating the modified circuit design. The method of an embodiment comprises selecting for the set any standard cell for which the noise value exceeds a second threshold.

The method of an embodiment comprises generating the modified circuit design by generating a modified standard cell by applying the parasitic variance and the device variance to a standard cell of the set. The method of an embodiment comprises generating a modified wire load by applying the parasitic variance to a wire load. The method of an embodiment comprises providing an input waveform to the modified standard cell and modified wire load. The method of an embodiment comprises determining the predicted variation of the modified standard cell. The performance parameter of an embodiment includes a delay across the modified standard cell and an output waveform of the modified standard cell.

The method of an embodiment comprises generating a second modified standard cell by applying the parasitic variance and the device variance to a second standard cell of the circuit design. The second modified standard cell of an embodiment is a next instance following the modified standard cell in a topological traversal of the design data. The method of an embodiment comprises providing the output waveform as the input waveform to the second modified standard cell and the modified wire load. The method of an embodiment comprises determining the predicted variation of the second modified standard cell. The performance parameter of an embodiment includes a second delay across the second modified standard cell and a second output waveform of the second modified standard cell.

The method of an embodiment comprises applying a noise waveform to an input of the modified standard cell. The method of an embodiment comprises determining the predicted variation of the modified standard cell. The performance parameter of an embodiment includes a noise magnitude at an output of the modified standard cell.

The method of an embodiment comprises modifying the circuit by modifying at least one cell of the set using information of the predicted variation.

The method of an embodiment comprises receiving a timing analysis of each standard cell of the circuit design. The timing analysis of an embodiment includes a timing slack of each standard cell. The timing analysis of an embodiment is performed before generating the modified circuit design. The method of an embodiment comprises determining leakage power of each standard cell. The determining of leakage power of an embodiment is performed before generating the modified circuit design.

The method of an embodiment comprises generating the modified circuit design by generating a modified standard cell corresponding to each standard cell by applying the second variance to each standard cell. The method of an embodiment comprises determining the predicted variation by determining leakage power of each modified standard cell.

The method of an embodiment comprises determining a leakage power variance of each standard cell.

Determining the leakage power variance of an embodiment includes comparing the leakage power of each standard cell with the leakage power of each modified standard cell.

The leakage power variance of an embodiment includes a change in off-state current drawn by the standard cell.

Determining the leakage power variance of an embodiment comprises replacing the devices in the standard cell with a device model that predicts the off-state current drawn by the standard cell given the second variance.

Determining leakage power of a cell including one or more of the standard cell and the modified standard cell comprises determining input logic states of the cell. The input logic states of an embodiment include at least one logic state of each input pin of the cell. Determining leakage power of a cell including one or more of the standard cell and the modified standard cell comprises determining average leakage power across the input logic states.

Determining average leakage power across the input logic states of an embodiment comprises determining a leakage current drawn in each of the logic states, and determining a probability of occurrence of each of the logic states.

The method of an embodiment comprises multiplying the leakage current drawn in each of the logic states with the probability of occurrence of each of the logic states to form a weighted average leakage current for each logic state. The method of an embodiment comprises summing the weighted average leakage current for all of the logic states.

The circuit design of an embodiment includes a drawing of a layout of the circuit.

The first variance of an embodiment represents shape distortions predicted to result from manufacturing of the IC.

The second variance of an embodiment represents misalignment of process layers predicted to result from manufacturing of the IC.

The method of an embodiment comprises representing the second variance using equivalent netlist parameters. The second variance of an embodiment includes a spatial variation in the device.

The method of an embodiment comprises determining the equivalent netlist parameters by determining changes to bounding box parameters of the device. The changes of an embodiment preserve correct behavior of the device under an operating condition. The method of an embodiment comprises summing the changes with corresponding ones of the bounding box parameters. The bounding box parameters of an embodiment include one or more of length, width, drain area, and source area.

The DFM systems described herein include a method comprising receiving design data of a circuit that includes devices and interconnects. The method of an embodiment comprises determining a first variance in shapes of the interconnects using the design data. The method of an embodiment comprises determining a second variance in shapes of the devices using the design data. The method of an embodiment comprises converting the first variance to a parasitic variance and converting the second variance to a device variance. The method of an embodiment comprises determining from one or more of the parasitic variance and the device variance a predicted variation in a performance parameter of an integrated circuit (IC) that includes the circuit.

The DFM systems described herein include a method comprising receiving design data of a circuit that includes a plurality of components. The method of an embodiment comprises determining a variance in shapes of the components using the design data. The method of an embodiment comprises converting the variance to one or more of a parasitic variance and a device variance. The method of an embodiment comprises determining from one or more of the parasitic variance and the device variance a predicted variation in a performance parameter of an integrated circuit (IC) that includes the circuit.

The DFM systems described herein include a method comprising calculating predicted variations of a drawn layout of a circuit design, the predicted variations including shape variations of interconnects and devices of the circuit design resulting during manufacturing of circuits under the circuit design. The method of an embodiment comprises converting interconnect variations to parasitic variations. The method of an embodiment comprises converting device variations to device parameter variations. The method of an embodiment comprises determining predicted changes in operating parameters of the circuit design from the parasitic variations and device parameter variations. The method of an embodiment comprises modifying the circuit design using the changes in operating parameters.

The DFM systems described herein include a method comprising receiving a circuit design of a circuit that includes devices and interconnects. The method of an embodiment comprises analyzing a plurality of standard cells of the circuit design. The method of an embodiment comprises generating a set of standard cells from the plurality of standard cells using results of the analysis. The method of an embodiment comprises determining shape variances of the interconnects and devices of the set and converting the shape variances to one or more of parasitic and device variances. The method of an embodiment comprises generating at least one modified cell by modifying at least one cell of the set to account for one or more of the parasitic and device variances. The method of an embodiment comprises determining a predicted variation of the circuit design using the modified cell. The method of an embodiment comprises modifying the circuit design using the predicted variation.

The DFM systems described herein include a method comprising receiving design data of a circuit, the design data including device models comprising one or more parameters representing one or more devices of the circuit. The method of an embodiment comprises generating a delta parameter corresponding to a parameter of a device. The delta parameter of an embodiment is generated to preserve operational behavior of the device under an operating condition. The method of an embodiment comprises generating an equivalent parameter by summing the parameter with the delta parameter. The equivalent parameter of an embodiment accounts for spatial variations in the device. The method of an embodiment comprises modifying the device model to generate a modified device model by replacing the parameter of the device model with the equivalent parameter.

The method of an embodiment comprises modifying the design data to generate modified design data by replacing the device model with the modified device model.

The device models of an embodiment include compact parameterized device models that model current-voltage characteristics of the device.

The parameters of an embodiment include geometric parameters. The geometric parameters of an embodiment include one or more of width, length, drain area, and source area.

The geometric parameters of an embodiment include Manhattan geometry parameters.

The geometric parameters of an embodiment include parameters of a bounding box of the device.

Generating an equivalent parameter of an embodiment comprises determining an equivalent device length.

Preserving operational behavior of an embodiment comprises preserving on-state drain-source current and delay across the device.

Preserving operational behavior of an embodiment comprises preserving contact threshold voltage of the device.

Preserving operational behavior of an embodiment comprises preserving output resistance of the device.

Preserving operational behavior of an embodiment comprises preserving off-state drain-source current across the device.

Preserving operational behavior of an embodiment comprises preserving timing performance of the device.

The timing performance of an embodiment includes a signal timing delay.

Preserving operational behavior of an embodiment comprises preserving signal integrity of the device.

The signal integrity of an embodiment includes one or more of threshold voltage and output resistance of the device.

Preserving operational behavior of an embodiment comprises preserving power consumption of the device.

The power consumption of an embodiment includes off-state current drawn by the devices.

The method of an embodiment comprises generating a table of on-state drain-source currents that includes on-state drain-source current for one or more of a gate length and a gate width of the device across a range of gate lengths and gate widths.

The method of an embodiment comprises generating a first equation at each location of a plurality of locations across the gate width. The first equation of an embodiment represents a current density at each location.

The first equation of an embodiment represents information of current distribution, stress effect, dopant distribution, and edge effects of the device at each location.

The method of an embodiment comprises generating a second equation by integrating the first equation for current density across the gate width. The second equation of an embodiment represents current as a function of the gate width.

The method of an embodiment comprises generating coefficients of the second equation by fitting the on-state drain-source current at each location to the second equation. The on-state drain-source current of an embodiment is a function of the gate width.

The method of an embodiment comprises generating a third equation comprising the first equation that includes the coefficients.

The method of an embodiment comprises partitioning the device into a plurality of partition devices. A width of each partition device of an embodiment is a partition gate width. A partition gate length of each partition device of an embodiment is approximately equal to a geometric gate length for that partition.

The method of an embodiment comprises determining partition current of a partition device by integrating the first equation across the partition gate width of the partition device. The partition current of an embodiment is current drawn by the partition device.

The method of an embodiment comprises determining total current drawn by the device by summing the partition current of all partition devices.

The method of an embodiment comprises determining the equivalent device length by locating a current value in the table that is approximately equal to the total current drawn by the device. The method of an embodiment comprises selecting as the equivalent device length a gate length from the table that corresponds to the current value.

The design data of an embodiment includes a drawing of a layout of the circuit. The drawing of an embodiment includes shape distortions predicted to result from manufacturing of the IC.

The DFM systems described herein include a method comprising receiving a circuit design including a plurality of components. The components of an embodiment are represented by component models that include a parameter. The method of an embodiment comprises generating a delta parameter corresponding to the parameter. The delta parameter of an embodiment preserves operational behavior of the component under a condition including one or more of timing, noise, and power consumption. The method of an embodiment comprises modifying the circuit design by integrating information of the delta parameter in at least one of the plurality of components.

Aspects of the DFM systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the DFM systems include: microcontrollers with memory (such as electronically erasable programmable read only memory (EEPROM)), embedded microprocessors, firmware, software, etc. Furthermore, aspects of the DFM systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages.

Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs including, without limitation, net-list generation programs, place and route programs and the like.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the DFM systems is not intended to be exhaustive or to limit the DFM systems to the precise form disclosed. While specific embodiments of, and examples for, the DFM systems are described herein for illustrative purposes, various equivalent modifications are possible within the scope of the DFM systems, as those skilled in the relevant art will recognize. The teachings of the DFM systems provided herein can be applied to other processing systems and methods, not only for the systems and methods described above.

The elements and acts of the various embodiments described above can be combined to provide further embodiments. These and other changes can be made to the DFM systems in light of the above detailed description.

In general, in the following claims, the terms used should not be construed to limit the DFM systems to the specific embodiments disclosed in the specification and the claims, but should be construed to include all systems and methods that operate under the claims. Accordingly, the DFM systems are not limited by the disclosure, but instead the scope of the DFM systems is to be determined entirely by the claims.

While certain aspects of the DFM systems are presented below in certain claim forms, the inventors contemplate the various aspects of the DFM systems in any number of claim forms. For example, while only one aspect of the system is recited as embodied in machine-readable medium, other aspects may likewise be embodied in machine-readable medium. Accordingly, the inventors reserve the right to add additional claims after filing the application to pursue such additional claim forms for other aspects of the DFM systems.

What is claimed is:

1. A method comprising:
    receiving design data of a circuit, the design data including device models comprising a first parameter, the device models representing one or more devices of the circuit;
    generating a first equation of a current density at each location of a plurality of locations across a gate width, wherein the step of generating the first equation is performed on a computer;
    using the first equation to generate an equivalent parameter representing a summation of the first parameter with a delta parameter, the equivalent parameter accounting for spatial variations in the device;
    generating the delta parameter corresponding to a parameter of a device, wherein the delta parameter is generated to preserve operational behavior of the device under an operating condition; and
    modifying the device model to generate a modified device model by replacing the parameter of the device model with the equivalent parameter.

2. The method of claim 1, wherein the first equation includes information of current distribution, stress effect, dopant distribution, and edge effects of the device at each location.

3. The method of claim 2, comprising generating a table of drain-source currents that includes drain-source currents for one or more of a gate length and a gate width of the device across a range of gate lengths and gate widths.

4. The method of claim 3, comprising generating a second equation by integrating the first equation for current density across the gate width, wherein the second equation represents current as a function of the gate width.

5. The method of claim 4, comprising determining coefficients of the second equation by fining the drain-source current at each location to the second equation, wherein the drain-source current is a function of the gate width.

6. The method of claim 5, comprising generating a third equation comprising the first equation that includes the coefficients.

7. The method of claim 5, wherein the drain source current is an on-state drain source current.

8. The method of claim 5, wherein the drain source current is an off-state drain source current.

9. The method of claim 2, further comprising determining coefficients for the first equation from the second equation.

10. The method of claim 9, comprising partitioning the device into a plurality of partition devices, wherein a width of each partition device is a partition gate width, wherein a partition gate length of each partition device is substantially equal to a geometric gate length for that partition.

11. The method of claim 10, comprising determining partition current of a partition device by integrating the first equation across the partition gate width of the partition device, wherein the partition current is current drawn by the partition device.

12. The method of claim 11, comprising determining total current drawn by the device by summing the partition current of all partition devices.

13. The method of claim 12, comprising:
determining the equivalent parameter by locating a current value in the table that is approximately equal to the total current drawn by the device; and
selecting as the equivalent device length a gate length from the table that corresponds to the current value.

14. The method of claim 3, determining coefficients for the first equation from the second equation.

15. The method of claim 3, wherein the drain source current is an off-state drain source current.

16. The method of claim 1, wherein the design data includes a drawing of a layout of the circuit, and wherein the drawing includes shape distortions predicted to result from manufacturing of the IC.

17. A computer aided design system, comprising:
an input device configured to receive design data of a circuit, the design data including device models comprising a first parameter, the device models representing one or more devices of the circuit;
a computer readable medium communicatively coupled to the input device and a processor, the computer readable medium having computer executable program code embodied thereon, the computer executable program code configured to cause the computer aided design system to perform the functions of:
generating a first equation of a current density at each location of a plurality of locations across a gate width;
using the first equation to generate an equivalent parameter representing a summation of the first parameter with a delta parameter, the equivalent parameter accounting for spatial variations in the device;
generating the delta parameter corresponding to a parameter of a device, wherein the delta parameter is generated to preserve operational behavior of the device under an operating condition; and
modifying the device model to generate a modified device model by replacing the parameter of the device model with the equivalent parameter; and
an output device communicatively coupled to the computer readable medium and the processor and configured to provide the modified device model.

18. The system of claim 17, wherein the first equation includes information of current distribution, stress effect, dopant distribution, and edge effects of the device at each location.

19. The system of claim 18, wherein the computer executable program code is further configured to cause the computer aided design system to perform the function of generating a table of drain-source currents that includes drain-source currents for one or more of a gate length and a gate width of the device across a range of gate lengths and gate widths.

20. The system of claim 19, wherein the computer executable program code is further configured to cause the computer aided design system to perform the function of generating a second equation by integrating the first equation for current density across the gate width, wherein the second equation represents current as a function of the gate width.

21. The system of claim 20, wherein the computer executable program code is further configured to cause the computer aided design system to perform the function of determining coefficients of the second equation by fitting the drain-source current at each location to the second equation, wherein the drain-source current is a function of the gate width.

22. The system of claim 21, wherein the computer executable program code is further configured to cause the computer aided design system to perform the function of generating a third equation comprising the first equation that includes the coefficients.

23. The system of claim 22, wherein the computer executable program code is further configured to cause the computer aided design system to perform the function of partitioning the device into a plurality of partition devices, wherein a width of each partition device is a partition gate width, wherein a partition gate length of each partition device is substantially equal to a geometric gate length for that partition.

24. The system of claim 23, wherein the computer executable program code is further configured to cause the computer aided design system to perform the function of determining partition current of a partition device by integrating the first equation across the partition gate width of the partition device, wherein the partition current is current drawn by the partition device.

25. The system of claim 24, wherein the computer executable program code is further configured to cause the computer aided design system to perform the function of determining total current drawn by the device by summing the partition current of all partition devices.

26. The system of claim 25, wherein the computer executable program code is further configured to cause the computer aided design system to perform the functions of determining the equivalent parameter by locating a current value in the table that is approximately equal to the total current drawn by the device; and selecting as the equivalent device length a gate length from the table that corresponds to the current value.

27. The system of claim 21, wherein the drain source current is an on-state drain source Current.

28. The system of claim 21, wherein the drain source current is an off-state drain source current.

29. The system of claim 18, wherein the computer executable program code is further configured to cause the computer aided design system to perform the function of determining coefficients for the first equation from the second equation.

30. The system of claim 17, wherein the computer executable program code is further configured to cause the computer aided design system to perform the function of determining coefficients for the first equation from the second equation.

31. The system of claim 17, wherein the drain source current is an off-state drain source current.

32. A computer program product comprising a computer useable medium having computer program code embodied therein for enabling a computing device to perform the functions of:
receiving design data of a circuit, the design data including device models comprising a first parameter, the device models representing one or more devices of the circuit;
generating a first equation of a current density at each location of a plurality of locations across a gate width;
using the first equation to generate an equivalent parameter representing a summation of the first parameter with a delta parameter, the equivalent parameter accounting for spatial variations in the device;

generating the delta parameter corresponding to a parameter of a device, wherein the delta parameter is generated to preserve operational behavior of the device under an operating condition; and modifying the device model to generate a modified device model by replacing the parameter of the device model with the equivalent parameter.

33. The computer program product of claim 32, wherein the first equation includes information of current distribution, stress effect, dopant distribution, and edge effects of the device at each location.

34. The computer program product of claim 33, wherein the computer executable program code is further configured to cause the computer aided design system to perform the function of generating a table of drain-source currents that includes drain-source currents for one or more of a gate length and a gate width of the device across a range of gate lengths and gate widths.

35. The computer program product of claim 34, wherein the computer executable program code is further configured to cause the computer aided design system to perform the function of generating a second equation by integrating the first equation for current density across the gate width, wherein the second equation represents current as a function of the gate width.

36. The computer program product of claim 35, wherein the computer executable program code is further configured to cause the computer aided design system to perform the function of determining coefficients of the second equation by fitting the drain-source current at each location to the second equation, wherein the drain-source current is a function of the gate width.

37. The computer program product of claim 36, wherein the computer executable program code is further configured to cause the computer aided design system to perform the function of generating a third equation comprising the first equation that includes the coefficients.

38. The computer program product of claim 37, wherein the computer executable program code is further configured to cause the computer aided design system to perform the function of partitioning the device into a plurality of partition devices, wherein a width of each partition device is a partition gate width, wherein a partition gate length of each partition device is substantially equal to a geometric gate length for that partition.

39. The system of claim 38, wherein the computer executable program code is further configured to cause the computer aided design system to perform the function of determining partition current of a partition device by integrating the first equation across the partition gate width of the partition device, wherein the partition current is current drawn by the partition device.

40. The computer program product of claim 39, wherein the computer executable program code is further configured to cause the computer aided design system to perform the function of determining total current drawn by the device by summing the partition current of all partition devices.

41. The computer program product of claim 40, wherein the computer executable program code is further configured to cause the computer aided design system to perform the functions of determining the equivalent parameter by locating a current value in the table that is approximately equal to the total current drawn by the device; and selecting as the equivalent device length a gate length from the table that corresponds to the current value.

42. The computer program product of claim 36, wherein the drain source current is an on-state drain source current.

43. The computer program product of claim 36, wherein the drain source current is an off-state drain source current.

44. The computer program product of claim 33, wherein the computer executable program code is further configured to cause the computer aided design system to perform the function of determining coefficients for the first equation from the second equation.

45. The computer program product of claim 32, wherein the computer executable program code is further configured to cause the computer aided design system to perform the function of determining coefficients for the first equation from the second equation.

46. The computer program product of claim 32, wherein the drain source current is an off-state drain source current.

* * * * *

UNITED STATES PATENT AND TRADEMARK OFFICE
CERTIFICATE OF CORRECTION

PATENT NO.        : 7,673,260 B2
APPLICATION NO.   : 11/586827
DATED             : March 2, 2010
INVENTOR(S)       : Haizhou Chen et al.

It is certified that error appears in the above-identified patent and that said Letters Patent is hereby corrected as shown below:

Col. 20, line 53, Claim 5 should read as follows:

The method of claim 4, comprising determining coefficients of the second equation by fitting the drain-source current at each location to the second equation, wherein the drain-source current is a function of the gate width.

Signed and Sealed this

Twentieth Day of April, 2010

David J. Kappos
*Director of the United States Patent and Trademark Office*